US012762550B1

(12) United States Patent
Hariri et al.

(10) Patent No.: US 12,762,550 B1
(45) Date of Patent: Oct. 13, 2026

(54) SYSTEMS AND METHODS FOR KEYLESS BLOCKCHAIN LOGIN USING PASSWORDLESS CREDENTIALS

(71) Applicant: APTOS FOUNDATION, George Town (KY)

(72) Inventors: Andrew Hariri, San Francisco, CA (US); Ioan Alin Tomescu Nicolescu, Austin, TX (US)

(73) Assignee: APTOS FOUNDATION, George Town (KY)

( * ) Notice: Subject to any disclaimer, the term of this patent is extended or adjusted under 35 U.S.C. 154(b) by 0 days.

(21) Appl. No.: 19/337,617

(22) Filed: Sep. 23, 2025

(51) Int. Cl.
*G06Q 20/38* (2012.01)
*G06Q 20/40* (2012.01)

(52) U.S. Cl.
CPC ..... *G06Q 20/3825* (2013.01); *G06Q 20/3829* (2013.01); *G06Q 20/40145* (2013.01)

(58) Field of Classification Search
CPC ............................................ G06Q 20/00–425
See application file for complete search history.

(56) References Cited

U.S. PATENT DOCUMENTS 9,124,433 B2 9/2015 Marien et al.
10,021,113 B2 7/2018 Oberheide et al.
10,038,555 B2 7/2018 Atherton
10,102,510 B2 10/2018 Yau et al.
10,454,918 B1 10/2019 Uhr et al.
10,659,233 B1 5/2020 Zhou
11,139,982 B2 10/2021 Ramzan et al.
11,182,783 B2 11/2021 Chawan et al.
11,288,655 B2 3/2022 Chen et al.
11,411,746 B2 8/2022 Godfrey
11,477,013 B2 10/2022 Shao
11,558,379 B2 1/2023 Salman et al.
11,757,651 B2 9/2023 Sekar et al.
11,842,350 B2 12/2023 Wong et al.
11,876,905 B2 1/2024 Wang et al.
11,915,314 B2 2/2024 Di Nicola et al.
11,956,374 B2 4/2024 Cabre et al.
11,985,254 B2 5/2024 Gong et al.
(Continued)

FOREIGN PATENT DOCUMENTS

WO 2023183778 A1 9/2023

*Primary Examiner* — Chenyuh Kuo

(57) ABSTRACT

Systems and methods include a user authenticated based at least in part on an on-device authentication mechanism to provide access to a passwordless secret key, and deriving a passwordless cryptographic signature using the passwordless secret key. a keyless account service signature over the passwordless cryptographic signature and a managing application identifier of a managing application is obtained from a keyless account service in response to an authentication request. A transaction is submitted to a blockchain, the transaction including: a passwordless signature associated with the passwordless cryptographic signature of the passwordless secret key, the cryptographic signature, transaction parameter, and a public key associated with the cryptographic signature, where the blockchain is configured to validate the transaction based at least in part on the signature associated with the passwordless cryptographic signature, the cryptographic signature, the transaction parameter and the public key.

22 Claims, 9 Drawing Sheets

(56) References Cited

U.S. PATENT DOCUMENTS 12,069,172 B2 8/2024 Jing et al.
12,113,912 B2 10/2024 Jang et al.
12,136,083 B2 11/2024 Vanham et al.
12,267,438 B2 4/2025 Heart et al.
12,299,686 B2 5/2025 Doraiswarmy et al.
12,307,443 B1 5/2025 Kurennykh et al.
12,335,255 B1 * 6/2025 Piri .......................... H04W 12/06
12,348,645 B2 7/2025 Law et al.
12,367,483 B1 7/2025 Pezeshki et al.
2015/0249540 A1 * 9/2015 Khalil ..................... H04L 63/18 713/158
2019/0386975 A1 * 12/2019 Li .......................... H04L 9/3239
2021/0241270 A1 8/2021 Raevsky et al.
2022/0239640 A1 * 7/2022 Wang .................. H04L 63/0892
2023/0131970 A1 4/2023 Bartolucci et al.
2023/0186273 A1 * 6/2023 Prabhu ............... G06Q 20/3678 705/69
2024/0127235 A1 4/2024 Lindermann
2024/0257105 A1 * 8/2024 Ahmad .............. G06Q 20/3263
2025/0030666 A1 * 1/2025 Chalkias ............. H04L 63/0428
2025/0202882 A1 * 6/2025 Griffin-Allwood .......................... H04L 63/0435
2025/0343676 A1 * 11/2025 Kim ...................... H04L 9/3247

* cited by examiner

SYSTEMS AND METHODS FOR KEYLESS BLOCKCHAIN LOGIN USING PASSWORDLESS CREDENTIALS

FIELD OF TECHNOLOGY

The present disclosure generally relates to computer-based systems and methods for providing keyless blockchain login using passwordless credentials.

BACKGROUND OF TECHNOLOGY

A blockchain is a distributed ledger with growing lists of records (blocks) that are securely linked together via cryptographic hashes. Typically, each block contains a cryptographic hash of the previous block, a timestamp, and transaction data. Since each block contains information about the previous block, the blocks form a chain with each additional block linking to the ones before it. Transactions are submitted to the blockchain with a signature over a secret key such that verifiers can review the transaction and signature and verify the signature based on a public key. Once verified, the transactions are added to the transaction data of a block.

SUMMARY

In some aspects, the techniques described herein relate to a method including: receiving, by at least one processor of a user device associated with a user, a passwordless secret key request requesting access to a passwordless secret key in response to a user selection on the user device to access the secret key; authenticating, by the at least one processor, the user based at least in part on at least one on-device authentication mechanism; deriving, by the at least one processor, passwordless cryptographic signature using the passwordless secret key based at least in part on the user being authenticated by the at least one on-device authentication mechanism; generating, by the at least one processor, an authentication request to a keyless account service, the authentication request including at least one field populated with the passwordless cryptographic signature; receiving, by the at least one processor, from the keyless account service in response to the authentication request, a keyless account service signature including a cryptographic signature, the cryptographic signature being configured to sign over the passwordless cryptographic signature and a managing application identifier of a managing application; and submitting, by the at least one processor, a transaction to a blockchain, the transaction including: a passwordless signature associated with the passwordless cryptographic signature of the passwordless secret key, the cryptographic signature, at least one transaction parameter, and a public key associated with the cryptographic signature; where the blockchain is configured to validate the transaction based at least in part on the signature associated with the passwordless cryptographic signature, the cryptographic signature, the at least one transaction parameter and the public key.

In some aspects, the techniques described herein relate to a method, where the secret key includes a WebAuthn compliant passkey.

In some aspects, the techniques described herein relate to a method, where the on-device authentication mechanism includes a biometric sensor.

In some aspects, the techniques described herein relate to a method, where the on-device authentication mechanism includes a password/credential manager.

In some aspects, the techniques described herein relate to a method, further including: authenticating, by the at least one processor, the user with at least one keyless access service based at least in part on the user logging into the at least one keyless access service using at least one keyless access service-specific credential; receiving, by the at least one processor from the at least one keyless access service, a keyless access signature based at least in part on the authentication of the user; and generating, by the at least one processor, upon the authenticating, the cryptographic signature for the transaction based at least in part on the keyless access signature.

In some aspects, the techniques described herein relate to a method, where using the secret key for generating the cryptographic signature includes: decrypting, by the at least one processor, at least one seed phrase based at least in part on the secret key; deriving, by the at least one processor, at least one private key associated with a blockchain account associated with the user; and applying, by the at least one processor, at least one cryptographic hash to the at least one transaction parameters based at least in part on the at least one private key.

In some aspects, the techniques described herein relate to a method, where the at least one seed phrase is encrypted using the secret key and a WebAuthn PRF extension.

In some aspects, the techniques described herein relate to a method, where the at least one transaction parameter includes at least one of: a passwordless secret key-derived public key, an ephemeral signature associated with the passwordless secret key-derived public key, or a cryptographic pepper.

In some aspects, the techniques described herein relate to a method, where the at least one field populated with the passwordless cryptographic signature includes at least one nonce field.

In some aspects, the techniques described herein relate to a method, further including: generating, by the at least one processor, the passwordless signature based at least in part on signing over the transaction parameters with the passwordless secret key.

In some aspects, the techniques described herein relate to a method, where the passwordless secret key request includes the transaction parameters; and where the passwordless cryptographic signature includes the passwordless signature over the transaction parameters using the passwordless secret key.

In some aspects, the techniques described herein relate to a system including: at least one processor of a user device associated with a user, the at least one processor being in communication with at least one non-transitory computer readable medium having computer instructions stored thereon, where the at least one processor, upon execution of the computer instructions, is configured to perform steps including: receiving a passwordless secret key request requesting access to a passwordless secret key in response to a user selection on the user device to access the secret key; authenticating the user based at least in part on at least one on-device authentication mechanism; deriving passwordless cryptographic signature using the passwordless secret key based at least in part on the user being authenticated by the at least one on-device authentication mechanism; generating an authentication request to a keyless account service, the authentication request including at least one field populated with the passwordless cryptographic signature; receiving from the keyless account service in response to the authentication request, a keyless account service signature including a cryptographic signature, the cryptographic signature being configured to sign over the passwordless cryptographic signature and a managing application identifier of a managing application; and submitting a transaction to a blockchain, the transaction including: a passwordless signature associated with the passwordless cryptographic signature of the passwordless secret key, the cryptographic signature, at least one transaction parameter, and a public key associated with the cryptographic signature; where the blockchain is configured to validate the transaction based at least in part on the signature associated with the passwordless cryptographic signature, the cryptographic signature, the at least one transaction parameter and the public key.

In some aspects, the techniques described herein relate to a system, where the secret key includes a WebAuthn compliant passkey.

In some aspects, the techniques described herein relate to a system, where the on-device authentication mechanism includes a biometric sensor.

In some aspects, the techniques described herein relate to a system, where the on-device authentication mechanism includes a password/credential manager.

In some aspects, the techniques described herein relate to a system, where the at least one processor, upon execution of the computer instructions, is configured to perform steps further including: authenticating the user with at least one keyless access service based at least in part on the user logging into the at least one keyless access service using at least one keyless access service-specific credential; receiving, by the at least one processor from the at least one keyless access service, a keyless access signature based at least in part on the authentication of the user; and generating upon the authenticating, the cryptographic signature for the transaction based at least in part on the keyless access signature.

In some aspects, the techniques described herein relate to a system, where using the secret key for generating the cryptographic signature includes: decrypting at least one seed phrase based at least in part on the secret key; deriving at least one private key associated with a blockchain account associated with the user; and applying at least one cryptographic hash to the at least one transaction parameters based at least in part on the at least one private key.

In some aspects, the techniques described herein relate to a system, where the at least one seed phrase is encrypted using the secret key and a WebAuthn PRF extension.

In some aspects, the techniques described herein relate to a system, where the at least one transaction parameter includes at least one of: a passwordless secret key-derived public key, an ephemeral signature associated with the passwordless secret key-derived public key, or a cryptographic pepper.

In some aspects, the techniques described herein relate to a system, where the at least one field populated with the passwordless cryptographic signature includes at least one nonce field.

In some aspects, the techniques described herein relate to a system, where the at least one processor, upon execution of the computer instructions, is configured to perform steps further including: generating the passwordless signature based at least in part on signing over the transaction parameters with the passwordless secret key.

In some aspects, the techniques described herein relate to a system, where the passwordless secret key request includes the transaction parameters; and where the passwordless cryptographic signature includes the passwordless signature over the transaction parameters using the passwordless secret key.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
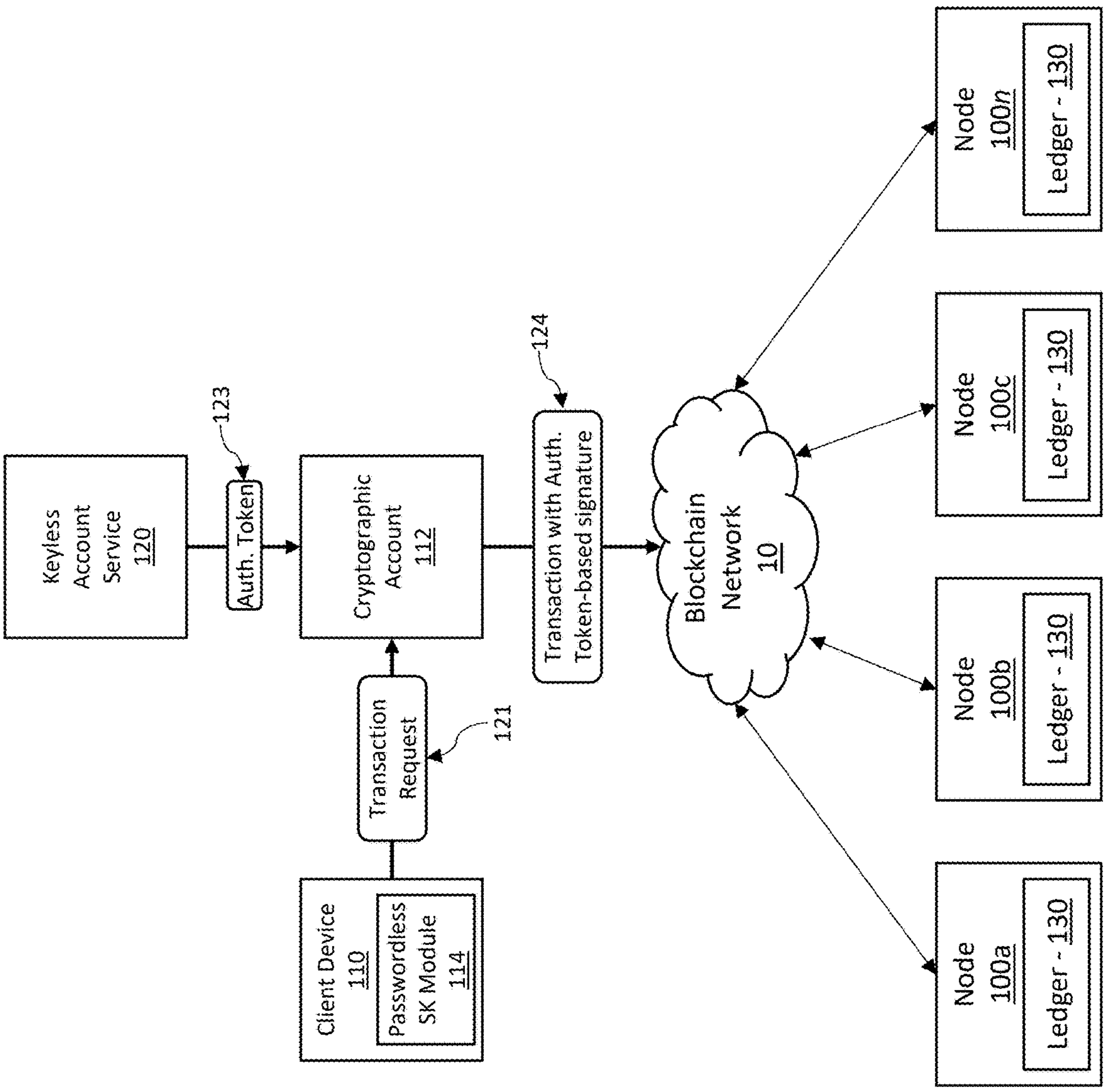
FIG. 1 depicts a network of nodes on a blockchain that leverage a keyless account service via a secret key for signing transactions on the blockchain in accordance with one or more embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive. Throughout the specification, the following terms take the meanings explicitly associated herein, unless the context clearly dictates otherwise. The phrases “in one embodiment” and “in some embodiments” as used herein do not necessarily refer to the same embodiment(s), though it may. Furthermore, the phrases “in another embodiment” and “in some other embodiments” as used herein do not necessarily refer to a different embodiment, although it may. Thus, as described below, various embodiments may be readily combined, without departing from the scope or spirit of the present disclosure.

In addition, the term “based on” is not exclusive and allows for being based on additional factors not described, unless the context clearly dictates otherwise. In addition, throughout the specification, the meaning of “a,” “an,” and “the” include plural references. The meaning of “in” includes “in” and “on.”

As used herein, the terms “and” and “or” may be used interchangeably to refer to a set of items in both the conjunctive and disjunctive in order to encompass the full description of combinations and alternatives of the items. By way of example, a set of items may be listed with the disjunctive “or”, or with the conjunction “and.” In either case, the set is to be interpreted as meaning each of the items singularly as alternatives, as well as any combination of the listed items.

FIGS. 1 through 8 illustrate systems and methods of generating a passwordless cryptographic signature for a transaction associated with a blockchain using a secret key. The following embodiments provide technical solutions and technical improvements that overcome technical problems, drawbacks and/or deficiencies in the technical fields involving blockchain security regarding the security of cryptographic keys used for signing transactions, as well as security and limited functionalities of transactions and the blockchain network due to information being hidden from the blockchain. In particular, the technical problems may include a user manually protecting a secret key associated with the user account, where it is common for secret keys to become lost or stolen. In certain embodiments, a secret key becomes lost when a user forgets a mnemonic code associated with the user account. In certain embodiments, a secret key becomes stolen when a user reveals, intentionally or accidentally, their secret key to an external individual.

In conventional blockchain systems, the management and use of cryptographic credentials, such as private keys or mnemonic phrases, present challenges in both security and usability. Users are typically required to manually store, protect, and utilize private keys to authorize transactions on a blockchain network. This approach is inherently vulnerable to a range of technical problems, including the risk of key loss, theft, accidental exposure, and user error. For example, if a user loses access to their private key or mnemonic phrase, access to the associated blockchain account may be irreversibly lost. Conversely, if a private key is exposed or stolen, unauthorized parties may gain control over the user’s blockchain assets. Furthermore, traditional key management methods do not readily integrate with modern, user-friendly authentication mechanisms, such as passwordless or biometric-based authentication, which are increasingly prevalent in contemporary computing environments.

As explained in more detail, below, technical solutions and technical improvements herein address the aforementioned problems by using passwordless secret key standards such as passkeys for an on-device authentication mechanism that can be used as a secret key associated with a user account such that one or more signatures and/or zero-knowledge proofs may be verified to validate a transaction. Because passkeys do not reveal their secret key to the user or other parties, the keys may be protected from loss, theft or other causes of compromise to the secret key, and as a result may improve the security of the blockchain account associated therewith. As a result, the verified transaction may be allowed to execute based on the user activating the passkey to automatically employ a secret key that is hidden from the user, the blockchain and any other systems and/or devices. In some embodiments, the passkey may replace one or more passwords and/or cryptographic keys for external data sources by having each external data source associate each user with a public key that is created from the passwordless secret key (“passwordless public key”) for a particular transaction, time period or other purpose.

The present disclosure addresses these and other technical problems by providing systems and methods for keyless blockchain login using passwordless credentials, such as WebAuthn-compliant passkeys. In various embodiments, the disclosed technology enables a user to access and utilize a blockchain account without the need to directly manage or interact with private cryptographic keys. Instead, the system leverages on-device authentication mechanisms-such as biometric sensors, secure hardware modules, or other passwordless authentication protocols—to securely generate and use passwordless cryptographic signature for blockchain transactions.

In one embodiment, a user device is configured to receive a request for access to a secret key in response to a user selection to initiate a blockchain transaction. The user is authenticated using at least one on-device authentication mechanism, such as a biometric sensor or a passwordless credential manager. Upon successful authentication, the device generates a passwordless cryptographic signature for the transaction using a secret key that is securely stored and inaccessible to the user or external parties. The passwordless cryptographic signature may be generated based on a cryptographic hash of one or more transaction parameters, a random authentication challenge, or other data or any combination or derivation thereof, and may utilize a WebAuthn-compliant passkey as the secret key. The transaction, along with the passwordless cryptographic signature, relevant transaction parameters, and a public key associated with the signature, is then submitted to the blockchain network for validation.

In certain embodiments, the system further supports the use of passwordless secret key-derived public keys and signatures, as well as the integration of zero-knowledge proofs to validate transaction parameters without revealing sensitive user information. For example, the system may generate a passwordless secret key-derived public key for the user, account, managing application, a specific transaction or any combination thereof, which can be published to the blockchain network for verification. In another example, the system may derive a signature over the transaction payload, and include a zero-knowledge proof that attests to the validity of private transaction parameters. This approach enhances both the privacy and security of blockchain transactions.

By abstracting the management of private cryptographic keys and integrating passwordless authentication mechanisms, the disclosed technology provides a secure framework for blockchain account access and transaction authorization. This system mitigates the risks associated with traditional key management, reduces the likelihood of key loss or theft, and enables integration with modern authentication standards, thereby addressing longstanding technical challenges in the field of blockchain security and usability.

Based on such technical features, further technical benefits become available to users and operators of these systems and methods. Moreover, various practical applications of the disclosed technology are also described, which provide further practical benefits to users and operators that are also new and useful improvements in the art.

In some embodiments, the term "passwordless secret key" refers to a cryptographic credential used for authentication or encryption that is derived and/or created independently of any password, username or both. In some embodiments, the passwordless secret key may be secured behind password-based authentication, among other authentication techniques or any combination thereof, but is not itself related to the password.

In some embodiments, the term "passwordless public key" refers to a cryptographic credential that may be published for authentication a signature derived from the passwordless secret key. In some embodiments, the passwordless public key may be derived from or otherwise corresponding to the passwordless secret key.

In some embodiments, the term "passkey" is used illustratively to facilitate understanding of principles of the disclosure. However, "passkey" is not limited to WebAuthn compliant passkey authentication, but rather may include any authentication mechanism that wraps a secret key of a key pair in an authentication protocol that leverage local, on-device, user authentication mechanisms to automatically create passwordless cryptographic signatures with a private key on the user's behalf including, e.g., hardware security keys such as, but not limited to, YubiKeys™.

Referring now to FIG. 1, a network of nodes on a blockchain that leverage a keyless access service via a secret key for signing transactions on the blockchain is depicted in accordance with one or more embodiments of the present disclosure.

In some embodiments, nodes 100*a* through 100*n* may participate in a distributed ledger 130 network. In some embodiments, the distributed ledger 130 may include a decentralized and distributed digital ledger that records transactions across multiple nodes 100*a* through 100*n*. This ensures that the recorded transactions cannot be altered retroactively without the alteration of all subsequent blocks and the consensus of the network.

In some embodiments, the distributed ledger 130 may include a chain of blocks where each block contains a header and a body. In some embodiments, blocks are linked together using cryptographic hashes. The hash of each block is calculated based on its contents and the hash of the previous block, ensuring integrity and immutability. The header includes metadata such as the previous block's hash, a timestamp, and nonce. The body, or payload, may include transaction data including a list of transactions submitted since a previous block.

In some embodiments, the transactions may include inputs, outputs, and a cryptographic signature. Inputs reference previous transaction outputs, and outputs specify the recipient's address and the amount. A transaction may then be validated by one or more nodes 100*a* through 100*n*, as further detailed below, by checking cryptographic signatures and secret keys, comparing parts cryptographic hash of a transaction parameter using the secret key, and verifying adherence to protocol rules.

In some embodiments, each node 100*a* through 100*n* may be any device (computer, server, etc.) that participates in the blockchain network. Nodes maintain a copy of the distributed ledger 130 and help validate and relay transactions. The collective set of nodes 100*a* through 100*n* ensure the network's integrity and security by following the consensus rules, thus requiring that for a transaction to be performed on the distributed ledger 130, a threshold number of nodes 100*a* through 100*n* must agree that the transaction is valid over a signature and in turn confirming a valid passkey associated with the secret key of a user. Accordingly, in some embodiments, the nodes 100*a* through 100*n* may store the entire distributed ledger 130 and validate all transactions and blocks to ensure the network's security and integrity by independently verifying transactions based on passkeys associated with the user.

In some embodiments, one or more of the nodes 100*a* through 100*n* may validate some or all transactions. Nodes 100*a* through 100*n* validate transactions by checking if they adhere to the network's rules (e.g., ensuring the sender, recipient and/or transaction conform to certain criteria). Validating transactions may include verifying signature that sign the transactions to ensure validity.

In some embodiments, one or more of the nodes 100*a* through 100*n* may also or instead validate blocks of the distributed ledger 130. In some embodiments, nodes 100*a* through 100*n* may verify new blocks by using one or more consensus mechanisms and ensuring all transactions within the block are valid. Consensus mechanisms may include one or more protocols used in the blockchain network to achieve agreement on the state of the distributed ledger 130 among the nodes 100*a* through 100*n*. The consensus mechanism(s) ensure that all participants in the network agree on the validity of transactions and the order in which they are added to the blockchain.

In some embodiments, the consensus mechanism(s) may include Proof of Work (PoW), such as in Bitcoin™, Ethereum™ or others. In PoW, the nodes 100*a* through 100*n* (miners) compete to solve a complex mathematical problem. The first to solve may be enabled to add the next block to the distributed ledger 130 and be rewarded with cryptocurrency.

In some embodiments, the consensus mechanism(s) may include Proof of Stake (POS), such as in Ethereum™ 2.0, Cardano™ or others. In some embodiments, PoS may include validators selected from amongst the nodes 100*a* through 100*n* create new blocks based on the number of coins they hold and are willing to "stake" as collateral. The more coins staked, the higher the chance of being selected.

In some embodiments, the consensus mechanism(s) may include Delegated Proof of Stake (DPoS), such as in EOS™, TRON™ or others. In DPOS, nodes 100*a* through 100*n* associated with coin holders vote for a small number of delegates who are responsible for validating transactions and creating new blocks.

In some embodiments, the consensus mechanism(s) may include Practical Byzantine Fault Tolerance (PBFT), such as in Hyperledger Fabric, Zilliqa, or others. In some embodiments, in PBFT, nodes 100*a* through 100*n* communicate with each other to agree on the state of the blockchain. A block is added when a supermajority (e.g., two-thirds) of nodes 100*a* through 100*n* agree.

In some embodiments, the consensus mechanism(s) may include Proof of Authority (PoA), such as in VeChain, POA Network or others. In some embodiments, in PoA, a limited number of pre-approved nodes 100*a* through 100*n*, termed validators or authorities, create new blocks. Validators are chosen based on their identity and reputation.

In some embodiments, the consensus mechanism(s) may include Proof of Burn (PoB), such as in Slimcoin™ among others. In some embodiments, in PoB, users associated with nodes 100*a* through 100*n* "burn" (destroy) a certain amount of cryptocurrency to gain the right to mine or validate transactions. This demonstrates their commitment to the network.

In some embodiments, the consensus mechanism(s) may include Proof of Capacity (PoC), such as in Burstcoin™ among others. In some embodiments, in PoC nodes 100*a* through 100*n* may allocate hard drive space to solve a cryptographic challenge. The more space allocated, the higher the chance of mining a block.

In some embodiments, the consensus mechanism(s) may include Proof of Elapsed Time (PoET), such as in Hyperledger Sawtooth™ among others. In some embodiments, in PoET, nodes 100*a* through 100*n* may wait for a randomly assigned time before creating a new block. The first to finish waiting gets to add the block.

In some embodiments, the nodes 100*a* through 100*n* may communicate with each other using a peer-to-peer (P2P) network, though other networks may be employed. Indeed, in some embodiments, the network may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet. This decentralized communication ensures that there is no single point of failure and that the network remains robust and secure.

In some embodiments, upon transactions and blocks being validated, a new block may be added to the distributed ledger 130 via a cryptographic hash of the previous block, a timestamp, and transaction data specifying the validated transactions submitted since the last block. Hashing ensures the integrity and immutability of the blockchain.

In some embodiments, as detailed above, a client device 110 may submit a transaction to the distributed ledger 130 for validation, including validation based on a cryptographic signature using a secret key. Typically, such cryptographic signatures may be made using a key pair, where the transaction details are signed with a secret (or "private") key such that validators may validate the signature using a public key paired to the secret key. However, secret keys can be lost, forgotten, stolen, and are generally cumbersome to use and maintain. Accordingly, embodiments herein may leverage passkeys to allow users to create and keep cryptographic keys without the need to explicitly record and provide the cryptographic keys. Thus, the client device 110 may use a passwordless secret key module 114 to derive passwordless cryptographic signature for a transaction request 121, which can be used in place of a traditional key pair.

Indeed, in some embodiments, the passwordless secret key may be used in tandem with a keyless account service 120 that validates an identity of the client device 110 based on an authentication request and issues an authentication token 123 in response. In certain embodiments, the confirmation of the authentication request and/or a particular authentication token 123 may be used to sign a transaction via a derived key based on the authentication token. Thus, a user at the client device 110, when creating a transaction via a transaction request 121, may authenticate the user and the passwordless secret key with the keyless account service 120 to obtain the authentication token 123 for the transaction, and then sign the transaction using the authentication token 123 and/or passwordless cryptographic signature derived from the passwordless secret key. As a result, a user may submit a transaction with an authentication token-based signature 124 to the distributed ledger 130 without needing to maintain a secret key that could otherwise be compromised or lost, thus improving the security and useability of the distributed ledger 130.

In the same or different embodiments, the user may employ the passwordless secret key without the keyless account service 120. The user may select via a node 100*a* through 100*n* to submit a transaction, and the node 100*a* through 100*n* may generate an authentication challenge for the transaction submission, which the user may employ the passwordless secret key to sign the transaction and publish the associated public key. In some embodiments, the authentication challenge may include the parameters of the transaction, thus resulting in the passwordless secret key signing over the parameters and forming a transaction signature. As a result, the transaction and the signed authentication challenge (e.g., forming the transaction signature) may be submitted to the blockchain along with the public key associated with the passwordless secret key. Thus, the user may keep the passwordless secret key on their device, e.g., backed-up in a cloud provider or kept only local, to sign transactions without the need to know the secret key.

Figure 2A:
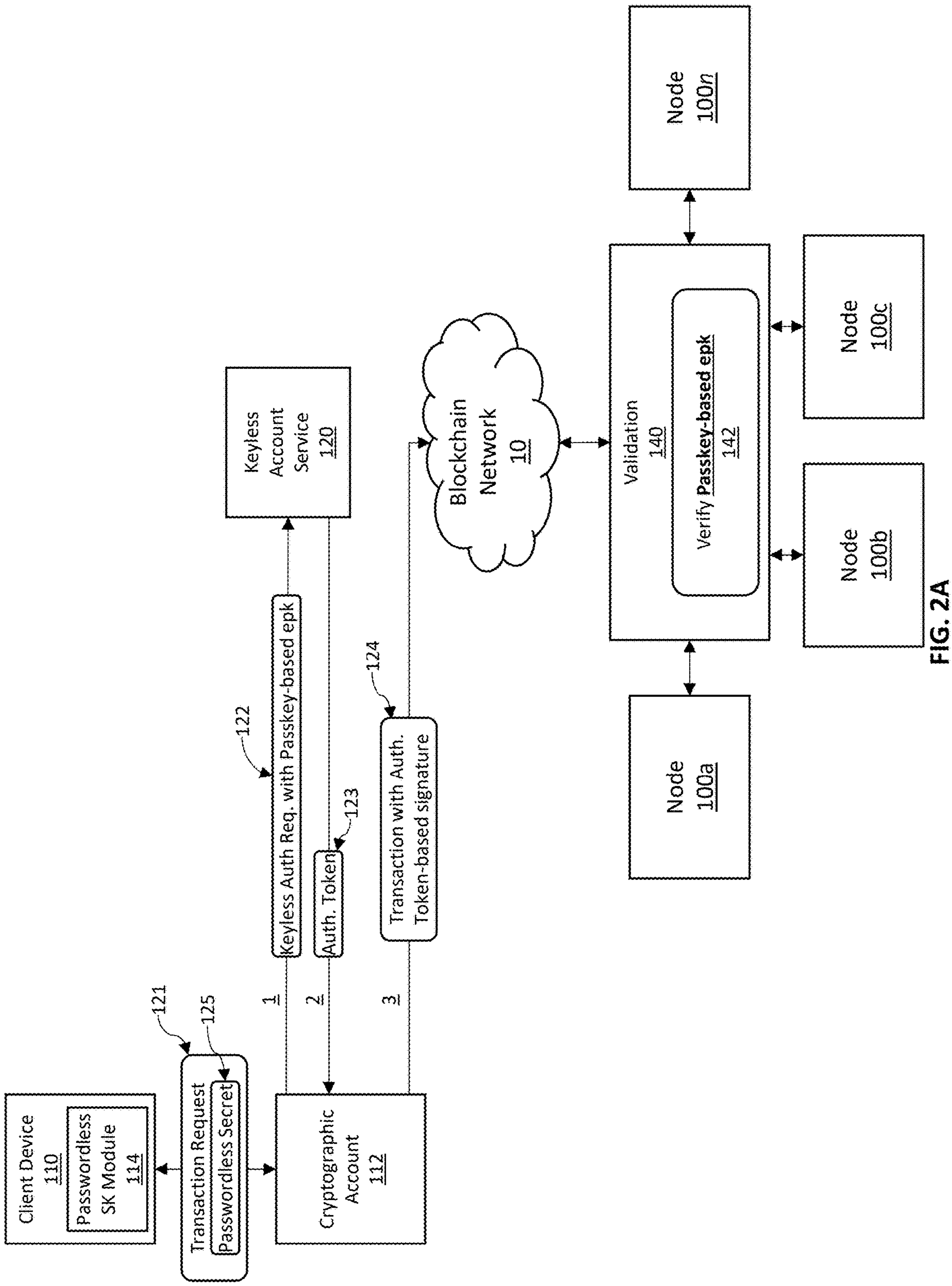
FIG. 2A depicts an exemplary node configured to generating a passwordless cryptographic signature using an on-device authentication mechanism provided by a secret key request and a blockchain configured to verify the information based on a passkey in accordance with one or more embodiments of the present disclosure.

Referring now to FIG. 2A, an exemplary node configured to generate a cryptographic signature using an on-device authentication mechanism and a keyless account service, and a blockchain configured to verify the information based on a passkey is depicted in accordance with one or more embodiments of the present disclosure.

In some embodiments, a node 100*a* may include a client device 110 and a cryptographic account 112. In some embodiments, the client device 110 may include at least one of, without limitation, a personal computer (PC), laptop computer, tablet, touch pad, portable computer, handheld computer, palmtop computer, personal digital assistant (PDA), smartphone, smartwatch, cellular telephone, combination cellular telephone/PDA, smart television, mobile internet device (MID), messaging device, data communication device, and so forth. Loaded onto the client device 110 may be an application or other software functionality that manages a cryptographic account 112.

In some embodiments, the cryptographic account 112 is used to sign transactions based on an address on the distributed ledger 130. In some embodiments, the address of the cryptographic account 112 may be a hash of a user identifier, and an account identifier associated with the cryptographic account 112, among other parameters, such as a privacy-preserving pepper, a salt, a nonce, or other inputs or any combination thereof.

In some embodiments, the cryptographic account 112 may be identified by its address, under which a public key of the cryptographic account 112 is stored. The passwordless secret key may refer to a secret key accessible by the user upon authentication of identity and/or of presence, where the secret key enables a cryptographically binding commitment to the cryptographic account 112 public key (PK) via the secret key.

Typically, the PK may be part of a key pair, e.g., derived from a master seed, where the owning user of the cryptographic account 112 manages the corresponding secret key. In some embodiments, to authorize access to the cryptographic account 112, a transaction may require a cryptographic signature and the PK committed to passkey under the cryptographic account 112 address, where the cryptographic signature is over the address of the cryptographic account 112 and the transaction payload (e.g., a Move entry function call or other transaction function call or any combination thereof). Thus, typically, to verify that a transaction is authorized to access the cryptographic account 112, each validator (e.g., nodes 100*b* through 100*n*) may fetch the public key from the transaction, compare the public key from the transaction to a key associated with a signature validation status; view one or more properties of the signature; and verify a signature certificate associated with the public key from the transaction.

However, as detailed above, such an arrangement requires that the user manage the secret key, which is often a complex alphanumeric, hexadecimal or other format string that is easily lost, forgotten, stolen, mistaken, or otherwise lost. Accordingly, the nodes 100*a* through 100*n* may be configured to use a passwordless secret key 125. The passwordless secret key 125 may be used to sign transactions, as detailed above.

In some embodiments, the passkey module 114 is configured to facilitate secure authentication by leveraging passwordless credentials, such as WebAuthn-compliant passkeys, to generate passwordless cryptographic signature for blockchain transactions. Upon receiving a request to access the passwordless secret credential, the passkey module 114 employs an on-device authentication mechanism, such as biometric verification or a secure hardware module, to authenticate the user. Once authenticated, the module derives passwordless cryptographic signature by signing an authentication challenge specific to the session using the passwordless secret credential 125. This passwordless cryptographic signature may include a digital signature over the challenge, transaction parameters, or other session-specific data, ensuring that the passwordless cryptographic signature is bound to the particular user and device. The derived passwordless cryptographic signature is then used to generate a transaction signature or included in an authentication request 122 to a keyless account service 120, enabling secure and seamless interaction with blockchain networks without requiring the user to directly manage private cryptographic credentials.

In some embodiments, the passwordless cryptographic signature may be included in the authentication request 122 by populating one or more fields or claims of the authentication request 122 with the passwordless cryptographic signature. In some embodiments, the field(s)/claim(s) populated with the passwordless cryptographic signature can include, e.g., a field designated to carry the passwordless cryptographic signature or a field that is designated to carry other information but is repurposed to carry the passwordless cryptographic signature, such as a nonce field. Indeed, in some embodiments, the passwordless cryptographic signature derived from the session-specific information that is signed over using the passwordless secret key can be used as unique data, and thus serve the additional purposes as a nonce in the authentication request 122. Thus, the nonce field of the authentication request 122 may be used to carry the passwordless cryptographic signature, among other data, such as an expiration, pepper, salt, among other information or any combination thereof.

For example, upon on-device user authentication (e.g., via an on-device authentication mechanism such as biometric sensor), the client device 110 may generate the passwordless cryptographic signature including a passwordless secret key-derived signature over the authentication challenge using the passwordless secret key, such as a secret key of the passkey. In some embodiments, because the information in the authentication challenge is unique to the authentication request, the signature thereof is unique and only reproducible with the appropriate keys and the specific information of the authentication challenge.

In some embodiments, the passwordless secret key 125 may be further leveraged in combination with keyless account logins by employing a keyless account service 120 to provide an authentication token 123 to attest to validity of the passwordless secret key. In some embodiments, the authentication token 123 may be used in place of a traditional PK, such that the nodes 100*a* through 100*n* may sign and/or validate transactions based on the authentication token 123 with the passwordless secret key 125 being leveraged to provide a transaction- or time period-specific public key (ephemeral public key) for the transaction. Thus, in some embodiments, to improve security and ease of use, the client device 110 may produce, using a passwordless secret key module 114, a transaction request 121 include transaction parameters and a passwordless secret 125 or passwordless cryptographic signature derived from the passwordless secret 125 such as a passkey-based signature ("pass_sig"). The cryptographic account 112 may be configured to create a transaction with an authentication token-based signature 124, including the pass_sig, by communicating with the keyless account service 120 to obtain authentication information for use in signing a transaction in place of the PK and/or secret key. Accordingly, the client device 110 may sign transactions with the cryptographic account 112 without requiring a master seed, private key or public key. Instead, the signing may leverage authentication of the user's identity via the keyless account service 120 and the passwordless secret 125 provided by the passwordless secret key module 114.

In some embodiments, the client device 110 may receive the authentication request 122 at step 1 to the keyless account service 120. The keyless account service 120 may include one or more hardware and/or software components for performing authentication on behalf of the user via an on-device authentication mechanism. An example of a keyless account service 120 is an OpenID Connect provider as per OAuth standards, though other entities, hardware and/or software may be used instead or in addition. For example, the keyless account service 120 may include a hardware authentication device such as a YubiKey™. Any other hardware and/or software components may be employed to authenticate an authentication request against known credentials such that an authentication token may be issued in response.

In some embodiments, the authentication request 122 may include data to be authenticated, which may include identity-related data as well as any additional data. Indeed, the authentication request may provide a user identifier, application identifier, client identifier, password, the passwordless cryptographic signature derived from the passwordless secret key, among other identity-related information associated with the credentials at the keyless account service 120. Thus, the keyless account service 120 may test such identity-related information against the authentic information of the identity.

In some embodiments, a user identifier may include any identifying information associated with a user, such as a username, an email address, a phone number, a mailing address, a social media profile, among other data or any combination thereof.

In some embodiments, an account identifier may include any identifying information identifying an account, such as a credit card number, bank account, cryptographic account address, among other account identifiers or any combination thereof.

In some embodiments, an application identifier may include data identifying an application, such as the application managing the cryptographic account 112 on the client device 110. The application identifier may include, e.g., an identifier assigned to uniquely identify the application, such as by a development platform, security service, application store, developer, etc., e.g., by random assignment, logic-based derivation based on attributes of the application, cryptographic hashing of attributes of the application, as well as other methods or any combination thereof.

In some embodiments, a client identifier may uniquely identify the client device 110, such as a serial number, model number, part number, MAC address, IP address, logic-based derivation based on attributes of the client device 110, cryptographic hashing of attributes of the client device 110 or other identifier or any combination thereof.

In some embodiments, a time may include a time and/or date at which the authentication request was created by the client device 110 and/or received by the keyless account service 120, or a time and/or date at which the authentication token was generated and/or sent by the keyless account service 120.

In some embodiments, an expiration period may include a period of time for which the authentication token is valid, such as, e.g., one minute, two minutes, three minutes, four minutes, five minutes, ten minutes, fifteen minutes, twenty minutes, thirty minutes, one hour, one day, or more.

In some embodiments, transaction data may include some or all of the data defining the transaction, such as operation or function call, source address, destination address, among other data or any combination thereof, or any hash of any combination thereof.

In some embodiments, the authentication request 122 may be adapted to specify additional data, such as data or information that the user may wish or be required to submit with the transaction to be revealed and validated, such as a user selection. Accordingly, the application managing the cryptographic account 112 may append the additional data to the authentication request. In some embodiments, the keyless account service 120 may generate a cryptographic signature based on the authentication and the parameters including any additional data.

In some embodiments, to facilitate generation of the cryptographic signature associated with the secret key, the authentication token 123 may also include passwordless cryptographic signature, such as cryptographic operations applied to the attributes to create a passwordless signature over the attributes. For example, the authentication token may specify a cryptographic algorithm such as, e.g., HMAC with SHA-256 (HS256), RSA signature with SHA-256 (RS256). JWA (JSON Web Algorithms) RFC 7518 among others or any combination thereof.

For example, the authentication token 123 may include a WebAuthn compliant JSON web token (JWT) having a header, a payload and a signature over the header and/or payload. In some embodiments, the header may specify the cryptographic operations applied to the JWT, including, e.g., the signing and/or decryption technique used (such as, without limitation, SHA-256 (HS256) and RSA signature with SHA-256 (RS256). JWA (JSON Web Algorithms) RFC 7518 among others or any combination thereof). It can also contain the data about the media/content type of the information we are sending. In some embodiments, the payload may include standard and/or custom fields defining claims. Examples of the standard fields may include, e.g., issuer ("iss"), subject ("sub"), audience ("aud"), expiration time ("exp"), not before ("nbf"), issued at ("iat"), JWT ID ("jti"), nonce ("nonce"), etc. In some embodiments, the keyless account service 120 and/or client device 110 may be configured to apply additional and/or alternative custom fields, such as, e.g., a user identifier ("uid"), among others or any combination thereof.

In some embodiments, the cryptographic account 112 may employ the authentication token 123 and/or the attributes/values thereof as the public key. As a result, in response to the authentication of the secret key, the user's ability to sign into the keyless account service 120, via the application managing the cryptographic account 112, to obtain the authentication token 123 at step 2, may serve as a cryptographic signature for the transaction. As a result, if a user can successfully use the application identified in the authentication request and/or authentication token to sign in to the user's account with the keyless account service 120, e.g., identified by user identifier key and/or value fields and issued by the keyless account service 120 identified in the authentication token, then that ability acts as that users' "cryptographic signature." By including the pass_sig in the authentication request 123, e.g., as a value populating the nonce field and/or in a commitment derived from the pass_sig and populating the nonce field, the pass_sig can be validated as being associated with the user and the client device 110 and indeed with the particular transaction by validating the authentication token 123 against the pass_sig.

For example, in the context of an authentication token including a JWT, the user must sign in to an OAuth/OpenID authentication mechanism (e.g., OpenID Connect provider) using a user identifier, passkey-derived passwordless cryptographic signature such as a passwordless signature over the authentication challenge and/or over transaction parameters, and a registered application. Thus, the user may sign in to the OAuth/OpenID authentication mechanism using a user identifier (e.g., an email address, username, etc.), a passkey and the application identifier associated with the application managing the cryptographic account 112. In return, upon authentication, the OAuth/OpenID authentication mechanism may provide a JWT having in its payload a uid specifying the user identifier, an aud specifying the application identifier, and an iss specifying the Oauth/OpenID authentication mechanism (e.g., authentication of the passkey-derived signature), and thus the uid value, the aud value and iss value may act as the user's cryptographic signature.

Indeed, the data included in the transaction data define parameters that must be proven in order for the transaction to be validated. Thus, the transaction data may include that which can validate the authentication token 123 and therefore the cryptographic account 112 to which the authentication token 123 has been issued.

In some embodiments, the cryptographic account 112 may communicate with the keyless account service 120 to generate a cryptographic signature for a transaction associated with the distributed ledger 130 in response to the authentication of the on-device authentication token 123. In some embodiments, the payload and the signature of the authentication token 123 provide provable parameters of the transaction, including the passwordless secret key-derived passwordless cryptographic signature. Thus, a validator may validate a transaction where the validator can create a derived authentication token signature based on the header information (e.g., the "kid") and the payload (the "AT") and match it to the actual secret key. For example, the node 100*a* may submit a transaction defining transaction parameters, the authentication token header, kid, with the cryptographic algorithm used, the authentication token payload ("AT") (including, e.g., the user identifier, the application identifier, a nonce, among other data or any combination thereof, among other data or any combination thereof), and the cryptographic signature, along with a transaction signature ("txn_sign") that signs over the transaction parameters, the authentication token header with the cryptographic algorithm used ("kid"), the authentication token payload ("AT"), and the cryptographic signature using a passkey to access the secret key.

In some embodiments, an authentication may be derived from the WebAuthn compliant secret key so as to ensure that only the holder of the cryptographic signature can sign transactions. For example, the passkey may be derived from a cryptographic hash of data from the cryptographic signature associated with the secret key, such as the keyless account service identifier, user identifier, application identifier, etc. Moreover, to further protect the privacy of the user's identity, the user identifier and application identifier (among other data) may be hidden within an identity commitment that hashes the user identifier and application identifier (among other data). The identity commitment and the keyless account service identifier may then be committed within an authentication key by hashing the identity commitment and the keyless account service identifier to create the cryptographic signature with which the transaction may be signed.

For example, for an authentication token associated with the passkey including a JWT, a public key may be created as the iss (the OAuth/OpenID authentication mechanism identifier, e.g., an OIDC provider identifier), together with an identity commitment formed from a hash of the user identifier, and the application identifier (e.g., identity commitment=H'(uid_key,uid_val,aud_val;r), where r←${0, 1}256). Accordingly, the authentication key may be derived as a hash of the iss and the identity commitment (e.g., auth_key=H(iss_val,addr_idc)).

Thus, to validate the transaction, a validator may fetch the identity commitment and the keyless account service identifier from the transaction and derive the transaction signature based on the public key. The validator may also check that this derived expected public key equals the public key stored under the address of the cryptographic account 112 and that the transaction signature verifies under the fetched identity commitment and keyless account service identifier over the transaction. As a result, without login information, the node 100*a* may sign and submit a transaction such that validators (e.g., nodes 100*b* through 100*n*) may validate the transaction based on the cryptographic signature thereof.

In some embodiments, to bind the cryptographic signature to the transaction such that the cryptographic signature cannot be reused, particularly because, as detailed above, the header, payload and signature thereof all are revealed, the cryptographic account 112 may authenticate the keyless account service 120 using the transaction or a hash thereof. For example, the authentication request may include as a nonce a hash of the transaction. Thus, upon authenticating the cryptographic account 112, the keyless account service 120 may sign over the transaction hash. As such, validating the transaction signature includes the particular transaction data committed with the transaction hash provided to the keyless account service 120.

However, in some embodiments, binding the secret key to the particular transaction may require a user to sign in to the keyless account service 120 for every transaction. Thus, in some embodiments, the application managing the cryptographic account 112 may generate a passwordless secret key-derived signature (the pass_sig) that may be provided to the keyless account service 120, e.g., as the nonce. As a result, the signature of the secret key may be generated over the pass_sig. The pass_sig may be used as an ephemeral signature over the transaction by signing the transaction, transaction parameters and/or a hash thereof with the passwordless secret key. In doing so, a validator may verify the ephemeral signature by fetching the passwordless public key associated with the passwordless secret key to test the pass_sig against the transaction and/or transaction parameters using the passwordless public key. Moreover, by including the pass_sig in the nonce of the authentication request, the secret key signature may only be verified with the correct pass_sig in the transaction. Thus, the passkey may be bound to the transaction without revealing transaction data to the keyless account service 120.

In some embodiments, the pass_sig may also be accompanied by an expiration period, such as an expiration date, a maximum epoch, or other definition of a time period. The expiration period may be provided in the authentication request such that upon authentication, the keyless account service 120 signs over the expiration period in addition to the pass_sig such that the cryptographic signature associated with the secret key becomes invalid upon expiration of the expiration period. Indeed, the expiration period may also be included in the transaction such that validators at validation 140 may verify that the pass_sig is not expired.

In some embodiments, the example of the keyless account service 120 being an OAuth/OpenID authentication mechanism such as an OIDC provider and the secret key and/or authentication key being a JWT, the transaction signature may be over a transaction txn for an address with authentication key auth_key is defined as:

σtxn=(uid_key,jwt,header,pass_sig,σeph,σoidc,exp_date, ρ,r,idc_aud_val)

where:

a. uid_key is the JWT field's name that stores the user's identity, whose value is committed in the address IDC,
b. jwt is the JWT payload,
c. header is the JWT header; indicates the OIDC signature scheme and the JWK's key ID, which may be used to verify the OIDC signature under the correct PK,
d. pass_sig, is a pass_sig (pass_sig) generated by the managing application (its associated esk is kept secret on the application managing the cryptographic account 112),
e. σeph is an ephemeral signature over the transaction txn,
f. σoidc is the OIDC signature over the full JWT (e.g., over the header and jwt payload), g. exp_date is a timestamp past which pass_sig is considered expired and cannot be used to sign TXN, h. ρ is a high-entropy pass_sig blinder used to create a pass_sig commitment to pass_sig and exp_date that is stored in the jwt["nonce"] field, i. r is a pepper for the address IDC, In such an example, to verify the otxn signature, validators may check, at validation 140, that the OIDC provider (1) signed the user identifier and application identifier that are committed in the address IDC (or, the recovery service's ID) and (2) signed the pass_sig which, in turn, signed the transaction, while enforcing some expiration date on the pass_sig.

In this Example, Validation 140 May Include Signature Verification Against the PK (Iss_Val,Addr_Idc), which May Involve the Following:

a. If using email-based IDs, ensure the email has been verified, e.g., if uid_key is to be shown to be equal to "email", assert jwt["email_verified"] is to be shown to be equal to "true", b. Assert addr_idc is to be shown to be equal to H' (uid_key,uid_val, aud_val;r), using the pepper r from the signature, c. Verify that the PK matches the authentication key on-chain, including asserting auth_key is to be shown to be equal to H (iss_val,addr_idc), d. Check the pass_sig is committed in the JWT's nonce field including asserting jwt["nonce"] is to be shown to be equal to H' (pass_sig,exp_date;ρ), e. Check the pass_sig expiration date is not too far off into the future including asserting exp_date is less than jwt["iat"]+max_exp_horizon, where max_exp_horizon is an on-chain parameter, f. Check the pass_sig is not expired, including asserting current_block_time( ) is less than exp_date, g. Verify the ephemeral signature seph under pass_sig over the transaction txn, h. Fetch the correct PK of the OIDC provider, denoted by jwk, which is identified via the kid field in the JWT header and i. Verify the OIDC signature σoidc under jwk over the JWT header and payload jwt. In some embodiments, this step that verifies the OIDC signature requires that validators agree on the latest JWKs (i.e., public keys) of the OIDC provider, who publishes them at a provider-specific OpenID configuration URL.

In some embodiments, as detailed above, the user may desire or be required to reveal additional information, for example to enable further operations on the blockchain network based on the additional information. Thus, the public information, provided in the transaction data, may include the additional information. Indeed, the transaction data may include an "extra field" associated with providing additional information.

In some embodiments, the above transactions include the user identifier and authentication token signature, which reveals user information to the blockchain network. Accordingly, to further improve security and confidentiality, the transaction may be based on zero-knowledge signatures. Thus, instead of the user identifier, authentication token payload and cryptographic authentication token signature, the transaction may include one or more commitments obfuscating user information, the authentication token header, the pass_sig, the pass_sig signature, the expiration period, the expiration maximum, and a zero-knowledge proof, where the zero-knowledge proof proves private information including the application identifier, user identifier, cryptographic signature, and secret key. Accordingly, in some embodiments, the transaction signature does not contain any identifying user information.

Rather, in some embodiments, validators, at validation 140, may validate the transaction signature by checking the expiration date, passkey, expiration maximum, ephemeral signature and public key of the keyless account service 120 as detailed above, and also derive a public inputs hash hashing the public inputs with a zero-knowledge algorithm, e.g., utilizing one or more of Succinct Non-Interactive ARguments of Knowledge (SNARK), Scalable Transparent ARgument of Knowledge (STARK), Verifiable Polynomial Delegation (VPD), Succinct Non-interactive ARGuments (SNARG), bulletproofs, among others or any combination thereof. Thus, in some embodiments, a validator may fetch the passwordless public key, pass_sig, identity commitment, pass_sig expiration date and expiration maximum, keyless account service identifier, authentication token header, and public key of the keyless account service 120.

In some embodiments, the zero-knowledge proof may argue the existence of a secret input that satisfies a passkey zero-knowledge relation. In some embodiments, the secret input, $w_{priv}$, may include, e.g., the application identifier, user identifier, cryptographic signature, and secret key. Thus, the zero-knowledge proof may prove the relation R according to equation 1 below:

$$R\left(\begin{array}{c} pih; \\ w = [w_{pub} = (\text{pass\_sig}, addr_{idc}, \text{exp}_{date}, \text{exp}_{maximum}, iss, \text{header}, \text{pk}), \\ w_{priv} = (aud, uid, \sigma_{AT}, \text{payload}_{AT})] \end{array}\right) \quad \text{Eq. 1}$$

where $w_{pub}$ are the public inputs, $w_{priv}$ are the private inputs, pass_pk is the pass_sig, $addr_{idc}$ is the identity commitment, $exp_{date}$ is the expiration period of the pass_sig, $exp_{maximum}$ is the expiration period maximum of the pass_sig, iss is the keyless account service identifier, header is the authentication token header, pk is the keyless account service public key, aud is the application identifier for the application managing the cryptographic account 112, uid is the user identifier, $\sigma_{AT}$ is the cryptographic signature, and $payload_{AT}$ is the secret key payload.

In some embodiments, as detailed above, the user may desire or be required to reveal additional information, for example to enable further operations on the blockchain network based on the additional information. Thus, the public information, provided in the transaction data and derived as public inputs to the zero-knowledge proof, may include the additional information. Indeed, the transaction data may include an "extra field" associated with providing additional information.

In some embodiments, the extra field may be assigned a certain type of data, such as a user identifier, user contact information, name, location, address, terms of the transaction (e.g., for a contract or agreement), among other data types or any combination thereof. Alternatively, or in additional, the extra field may be assigned no type of data such that the user may populate the extra field with any information.

Figure 2B:
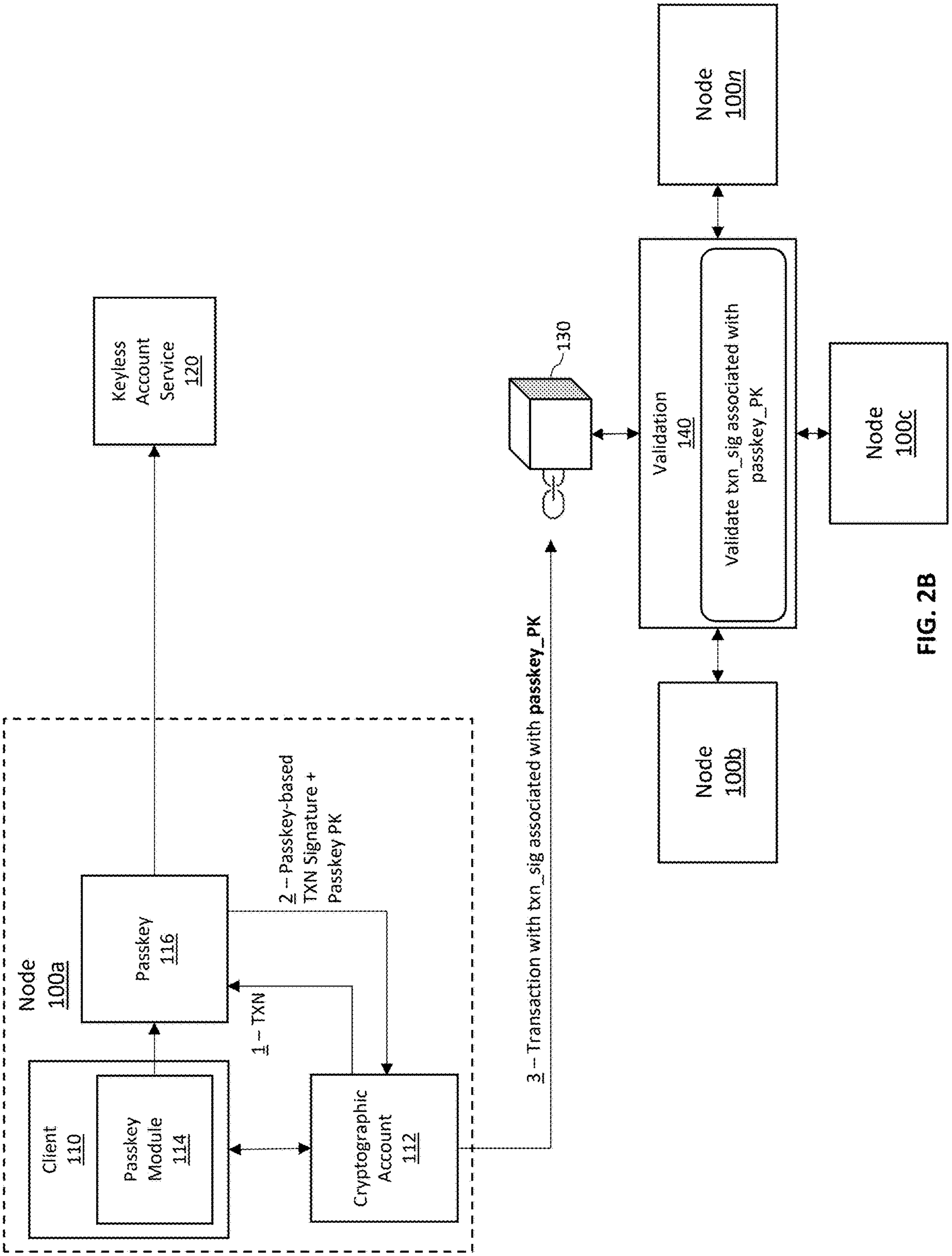
FIG. 2B depicts another exemplary node configured to generate a passwordless cryptographic signature using an on-device authentication mechanism and a keyless account service, and a blockchain configured to verify the information based on a passkey in accordance with one or more embodiments of the present disclosure.

Referring now to FIG. 2B, another exemplary node configured to generate a cryptographic signature using an on-device authentication mechanism and a keyless account service, and a blockchain configured to verify the information based on a passkey is depicted in accordance with one or more embodiments of the present disclosure.

In some embodiments, client device 110 includes a passkey module 114, which is configured to manage and utilize a passkey 116 for cryptographic operations. The passkey module 114 interfaces with a cryptographic account 112, which is associated with the client device 110 and is responsible for initiating blockchain transactions.

In operation, the cryptographic account 112 generates a transaction (TXN) comprising one or more transaction parameters. The transaction is provided to node 100*a*, which is associated with the client device 110. Node 100*a* employs the passkey 116 to generate a passkey-based transaction signature (txn_sig) by signing over the transaction parameters. The public component of the passkey (pass_pk) is included in the transaction, thereby binding the transaction to the specific passkey 116.

Node 100*a* may further communicate with a keyless account service 120. In some embodiments, the keyless account service 120 is configured to sign over the passkey public key and/or the passkey-based transaction signature, thereby providing an additional layer of authentication and attestation. This step ensures that the passkey_PK and the associated signature are validated by a trusted external service prior to submission to the blockchain network.

Once the transaction, including the txn_sig and passkey_PK, is finalized, it is submitted to a distributed ledger 130. The distributed ledger 130 is maintained by a plurality of nodes, including node 100*b*, node 100*c*, and node 100*n*. Validation of the transaction is performed by a validation 140, which is configured to verify the txn_sig based on the passkey_PK. The validation process ensures that the transaction parameters were signed using the correct passkey 116 and that the passkey_PK is valid and authorized for the transaction.

Upon successful validation, the transaction is recorded on the distributed ledger 130, ensuring immutability and integrity of the transaction data. The network of nodes, including node 100*b*, node 100*c*, and node 100*n*, collectively maintain consensus and validate all transactions submitted to the blockchain.

Accordingly, in some embodiments, the client device 110 leverages a passkey 116, in conjunction with a keyless account service 120, to securely sign and validate blockchain transactions. This architecture enhances both the security and usability of blockchain systems by integrating passkey-based authentication and keyless account services, thereby mitigating risks associated with traditional key management and improving the overall user experience.

Figure 3:
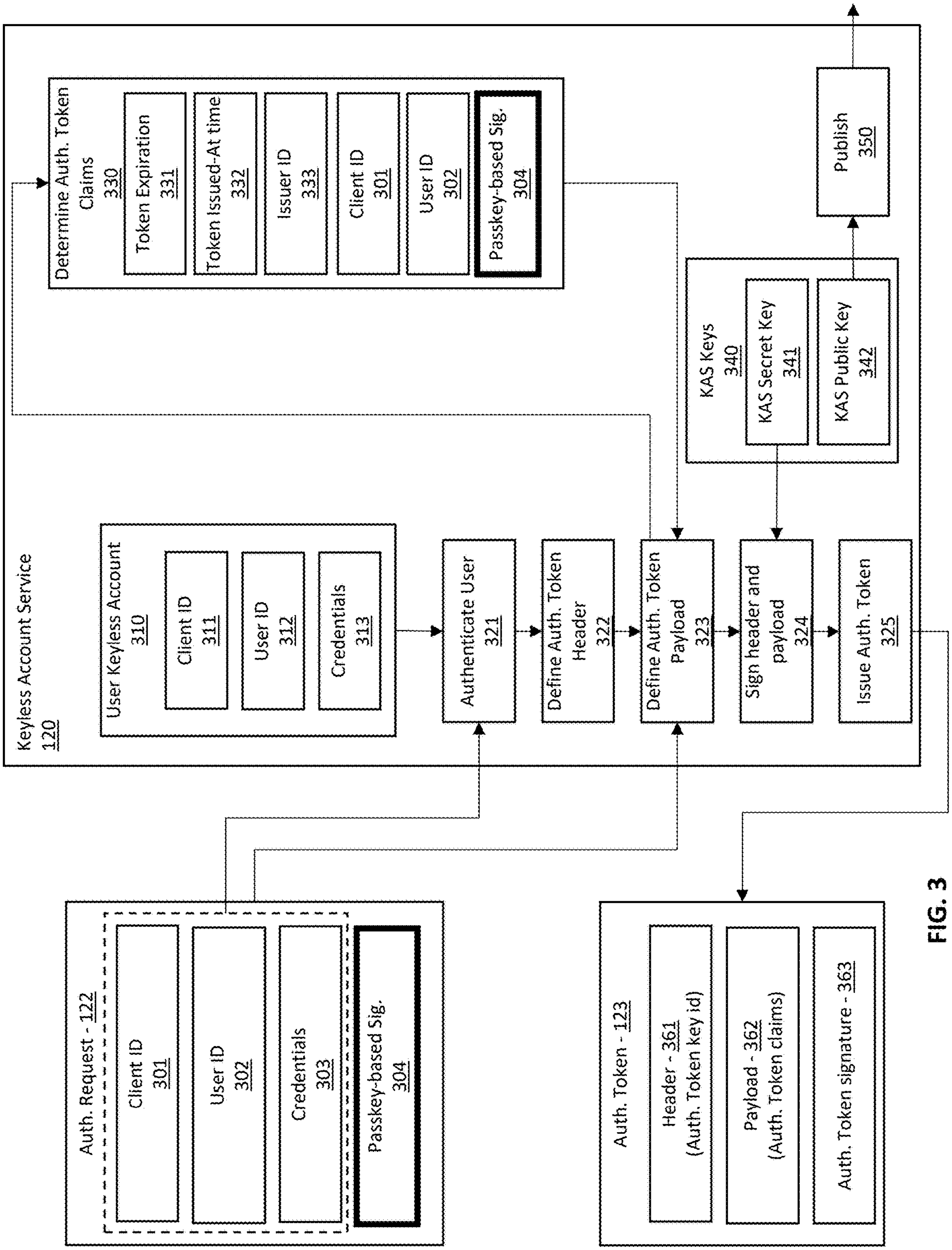
FIG. 3 depicts a keyless account service generating an authentication token for signing a transaction based on an authentication request of a cryptographic account in accordance with one or more embodiments of the present disclosure.

Referring now to FIG. 3, a keyless account service is illustrated generating an authentication token for signing a transaction based on an authentication request of a cryptographic account in accordance with one or more embodiments of the present disclosure.

In some embodiments, the cryptographic account 112 may be managed by a managing application. The managing application be a local software application on the client device 110 or may be a remotely hosted service, or any combination thereof. The cryptographic account 112, via the managing application, may send an authentication request 122 to the keyless account service 120 to authenticate the user and the managing application. In response, upon authentication against the user's account at the keyless account service 120, the keyless account service 120 may return an authentication token 123 that authenticates the identity and the managing application.

In some embodiments, the authentication request 122 may include claims to be authenticated by the keyless account service 120. The claims may include, without limitation, a client ID 301. In some embodiments, the client ID 301 may represents an identifier for the client device 110 associated with the cryptographic account 112, managing application and client device 110 for authenticating the user identity. The claims may include, without limitation, a user ID 302. In some embodiments, the user ID 302 may represents user identifying information for authenticating the user, such as, e.g., an email, a phone number, a username, a passkey, among other representations of identity or any combination thereof. The claims may include, without limitation, credentials 303 associated with authenticating the user's identity, such as, e.g., authentication information such as encryption keys, password, passkey, cryptographic token, among others or any combination thereof.

The claims may include, without limitation, a nonce 304. A nonce is a field that may be populated with randomness or other unique information to the authentication request 122 for increasing security, e.g., by preventing replay attacks. Typically, the nonce 304 may be populated with a unique, random string generated by the client device 110, managing application and/or cryptographic account 112 so as to bind the resulting authentication token 123 to the specific authentication request 122. Here, however, the nonce may be populated with key information specific to this authentication request 122, such as a limited use and/or limited time public key (e.g., an "ephemeral" public key). In populating the nonce 304 with an passwordless secret key-based ephemeral public key specific to the authentication request 122, the authentication token 123 may be bound to the authentication request 122 while also making the passwordless secret key-based ephemeral public key verifiable under the authentication token signature 363, thus enabling the authentication token 123 to authenticate the passwordless secret key-based ephemeral public key. As a result, the ephemeral key may be included such that use of the ephemeral key in signing a transaction associated with the authentication request 122 can be validated by verifying the authentication token signature over the ephemeral key. In some embodiments, the nonce 304 may also include other data, such as a random value/string, one or more policies associated with the passwordless secret key-based ephemeral public key, a counter, a pepper, among others or any combination thereof.

In some embodiments, the authentication request 122 may additionally include one or more claims for other information over which the keyless account service 120 may sign. As with the other claims, by including additional information in one or more claims, the authentication token signature 363 signs over such additional information making later-asserted additional information verifiable over the authentication token signature 363. In some embodiments, the cryptographic account 112 may be configured to match to-be-revealed data that is to be included in the blockchain transaction to one or more claims of the authentication request 122 and/or authentication token 123.

Alternatively or additionally, in some embodiments, the cryptographic account 112 may be configured to create a custom field in the authentication request 122 to be used as the to-be-revealed data. In such embodiments, the cryptographic account 112 may be configured to populate the to-be-revealed data 305 with a default value, such as a null value, a constant, a default message or string, or other default.

Upon defining the transaction, the user may specify information different from the default value that the user wishes to reveal on the blockchain network 10 in a verifiable manner. For example, the user may select to reveal user identifying information, e.g., for know-your-customer checks, fraud checks, etc., or any other information that the user wishes or is required to assert in a verifiable manner. In selecting to reveal the information, the cryptographic account 112 may insert data representative of the information into the to-be-revealed data field(s) to be signed over by the keyless account service 120 for later verification. Thus, the to-be-revealed data may be selectively employed, with the to-be-revealed data and transaction payload defaulting to a default value with the option for a user to define different information.

In some embodiments, the keyless account service 120 may manage a user keyless account 310 for authenticating the user in the use of software applications, such as the cryptographic account 112 and/or a managing application thereof. The keyless account service 120 may authenticate the user 321 based on the application and/or device being used to request authentication, an identity of the user and account credentials. Thus, the keyless account service 120 may test the client ID 301, user ID 302 and credentials 303 against the user keyless account 310, including a client ID 311, user ID 312 and credentials 313 of the user keyless account 310.

In some embodiments, upon authentication, the keyless account service 120 may define an authentication token header 361, an authentication token payload 362 and an authentication token signature 363 based on a signing of the authentication token payload 362 and/or the authentication token header 361. Collectively, these items for the authentication token 123 attesting to the authenticity of the user.

In some embodiments, the keyless account service 120 may define the authentication header at 322. In some embodiments, the authentication token header 361 may include, e.g., the cryptographic protocol for producing the authentication token signature 363, such as the cryptographic function (e.g., hash function), among other parameters for generating the authentication token signature 363. The cryptographic protocol may be, e.g., as in a JSON Web Token, a key ID or kid.

In some embodiments, the keyless account service 120 may define the authentication token payload 362 at 323. The authentication token payload 362 may include one or more claims for which authenticity may be verified via the authentication token signature 363. The claims may include data and/or information representative of the user being authenticated, the device with which the user is requesting authentication, the application and/or account being authenticated, and any other information being committed, bound or otherwise associated with the authentication, including the to-be-revealed data. Thus, upon authentication, the keyless account service 120 may also define, before, during or after the header, an authentication token payload 323. In some embodiments, the authentication token payload 362 may include data, e.g., in the form of a set of key-value pairs or other data structure. For example, each claim may include a key identifying a type according to one or more defined types associated with a particular claim, and a value representing the populated data for that claim according to the type (e.g., the user ID may have a key defining a type of ID (email, telephone, username, legal name, etc.) and a value populating the user's ID of that type (e.g., JohnDoe@gmail.com, (123) 456-7890, johndoe1, John Doe, etc.).

In some embodiments, the keyless account service 120 may determine that authentication token claims, at 330, based on the authentication request 122, the user keyless account 310 among other configurations, policies, parameters, defaults, etc. For example, the authentication request 122 may specify the to-be-revealed data to cause the keyless account service 120 to determine the to-be-revealed data 305 as a claim. Alternatively, or in addition, the user keyless account 310 may be configured to cause the keyless account service 120 to include the to-be-revealed data as part of the authentication token claims.

In some embodiments, the authentication token claims may include, without limitation, claims as specified by the keyless account service 120, the authentication request 122 or both, e.g., as detailed above with reference to FIG. 3. For example, the claims may include a token expiration 331 (e.g., time, date, duration, etc.), a token issued—at time 332 (a date and/or time associated with issue the authentication token 123), an issuer ID 333 (e.g., an identifier associated with issuing the authentication token, such as an ID associated with the keyless account service 120 such as, for OIDC, the issuer ID 333 may be a unique ID of the OIDC provider), a client ID 301 (or client ID 311 since they are equivalent), a user ID 302 (or user ID 312 since they are equivalent), a nonce 304, among other data to be verified during validation 140.

In some embodiments, using the cryptographic protocol defined in the authentication token header 361, the keyless account service 120 may sign the authentication token payload 362, at 324, including the claims defined therein, to produce the authentication token signature 363. In some embodiments, the keyless account service 120 may sign the authentication token payload 362 and/or authentication token header 361 using keyless account service (KAS) keys 340 including a KAS secret key 341 and a KAS public key 342 paired with the KAS secret key 341. The KAS keys 340 may be associated with, derived based on, or otherwise related to the cryptographic protocol defined in the authentication token header 361.

In some embodiments, the keyless account service 120 may publish 350 the KAS public key 342 in order to allow external entities to use the KAS public key 342 to verify the authentication token signature 363. The keyless account service 120 may use the KAS secret key 341 to derive the KAS public key 342 and/or to sign the authentication token payload 362 and/or authentication token header 361 at 324.

In some embodiments, upon generating the authentication token signature 363, the keyless account service 120 may issue the authentication token 123, including the authentication token header 361, the authentication token payload 362 and the authentication token signature 363, and issue, at 325, the authentication token 123 to the cryptographic account 112 in response to the authentication request 122.

Figure 4:
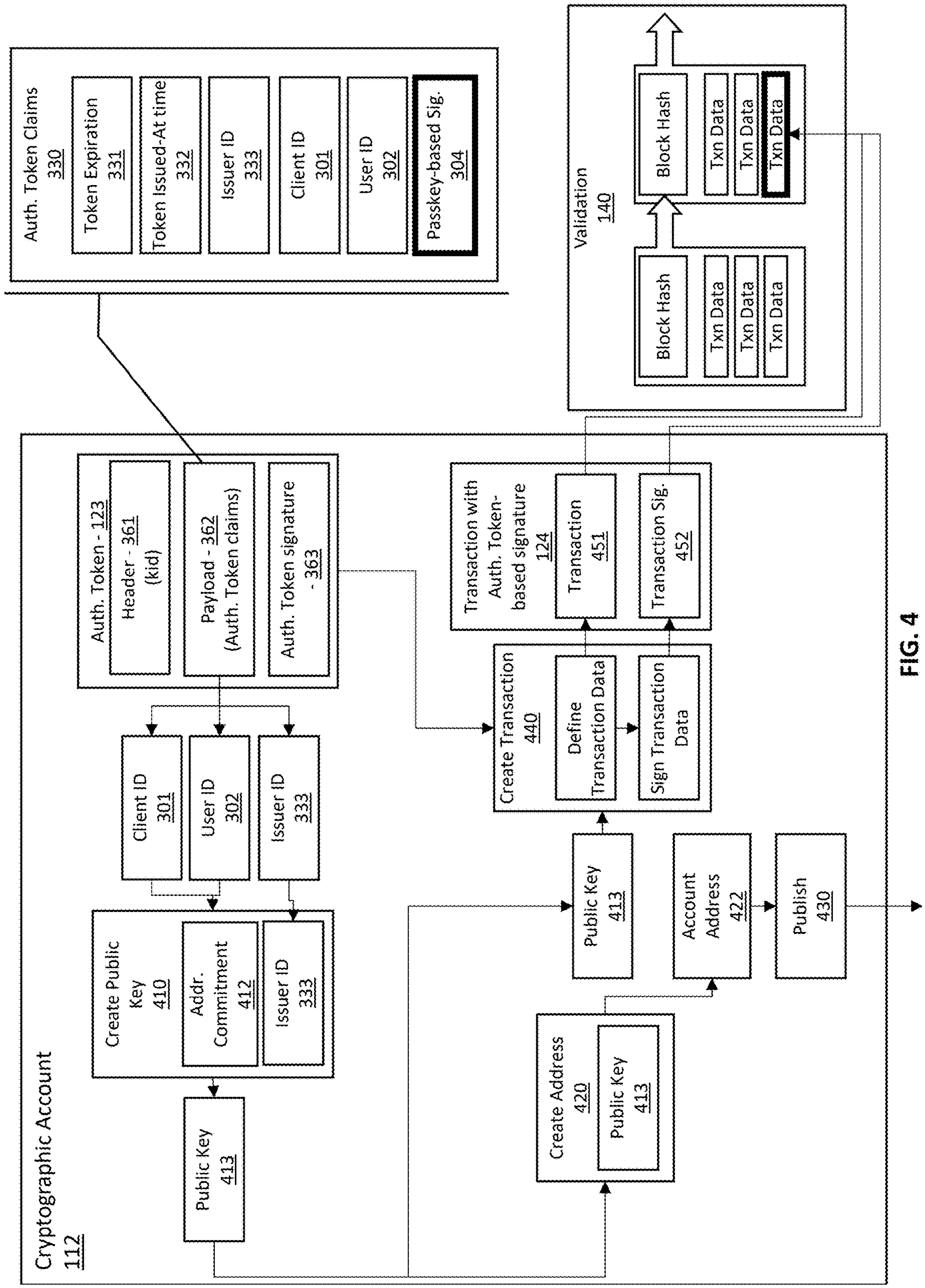
FIG. 4 depicts a cryptographic account creating and signing a transaction for submission to a blockchain ledger using the authentication token of the keyless account service in accordance with one or more embodiments of the present disclosure.

Referring now to FIG. 4, a cryptographic account is depicted creating and signing a transaction for submission to a blockchain ledger using the authentication token of the keyless account service in accordance with one or more embodiments of the present disclosure.

In some embodiments, the cryptographic account 112 may receive the authentication token 123 in response to the authentication request 122. In some embodiments, the authentication token 123 may include the authentication token header 361, authentication token payload 362, and the authentication token signature 363 as defined and produced by the keyless account service 120, including, e.g., any to-be-revealed data 305 of the authentication request 122. Thus, the cryptographic account 112 may employ the authentication token 123, including to-be-revealed data associated with one or more of the authentication token claims 330, to create and sign a transaction with authentication token-based signature 124 such that the to-be-revealed data may be verified during validation 140 as well as required to verify the transaction during validation 140.

In some embodiments, the authentication token payload 362 may include claims as specified by the keyless account service 120, the authentication request 122 or both, e.g., as detailed above with reference to FIG. 3. For example, the claims may include a token expiration 331 (e.g., time, date, duration, etc.), a token issued—at time 332 (a date and/or time associated with issue the authentication token 123), an issuer ID 333 (e.g., an identifier associated with issuing the authentication token, such as an ID associated with the keyless account service 120 such as, for OIDC, the issuer ID 333 may be a unique ID of the OIDC provider), a client ID 301 (or client ID 311 since they are equivalent), a user ID 302 (or user ID 312 since they are equivalent), a nonce 304, among other data to be verified during validation 140.

In some embodiments, using the authentication token payload 362, the cryptographic account 112 may create a public key 413 at 410 for a transaction. In some embodiments, creating the public key 413 may include accessing the issuer ID 333 of the authentication token payload 362 and an address commitment 412 based on the client ID 301 and the user ID 302 from the authentication token payload 362.

The address commitment 412 may include a hash, using one or more hash algorithms, of identifying information for use with the transaction. By hashing the identifying information, the identifying information can be hidden from discovery while using the hash to uniquely correspond to the user and/or the cryptographic account 112. Indeed, by creating the address commitment 412 from the client ID 301 and the user ID 302, the identifying information for the user and the identifying information for the cryptographic account 112 may be committed via the hash. Further, by using the client ID 301 and the user ID 302 provided via the authentication token 123, the address commitment 412 may hide a commitment to authenticated information, enabling the address commitment 412 to be verified in view of the authentication token payload 362. In some embodiments, to make the address commitment 412 less susceptible to replay attacks and/or to create single use address commitments 412, and thus single use public keys 413 (e.g., an "passwordless secret key-based ephemeral public key"), the hash to create the address commitment 412 may include randomness, a nonce, or other variable or any combination thereof.

In some embodiments, the address commitment 412 and the issuer ID 333 may produce a public key 413 for use in verifying the transaction. Because the identifying information from the authentication token 123 is committed in the address commitment 412, the "secret key" associated with the public key 413 may be the user's ability to sign in to the keyless account service 120 via the managing application of the cryptographic account 112 committed in the client ID 301. Put differently, the "secret key" can be thought of as the user's credentials 313 for that account, which the user already knows, or a pre-installed HTTP cookie which precludes the need for the user to re-enter the password. Further, this password may not be sufficient. Rather, in some embodiments, the managing application must be available, must allow the user to sign in to the user keyless account 310 and receive the authentication token 123 including the authentication token signature 363.

In some embodiment, the cryptographic account 112 may use the public key 413 to create an address 422, at 420, for use with the transaction. To do so, the cryptographic account 112 may hash the public key 413 using one or more cryptographic hash functions. In some embodiments, the address 422 may also include, via the cryptographic hash function, the issuer ID 333 obtained form the authentication token payload 362. As a result, the address 422 may be a unique identifier for the cryptographic account 112 based on the client ID 301 and user ID 302 (via the address commitment 412) and the issuer ID 333, thus making the address dependent on the managing application of the cryptographic account 112, the user and the keyless account service 120 may be verifiable.

In some embodiments, the address 422 may be published 430, e.g., via storing the address 422 in associated with the cryptographic account 112 (e.g., under a cryptographic or blockchain address of the cryptographic account 112) so as to be accessible to the blockchain network 10.

In some embodiments, the create the transaction, at 440, for submission to the blockchain network 10, the cryptographic account 112 may define transaction data and sign the transaction data so as to produce a transaction 451 and a transaction signature 452.

In some embodiments, the defining the transaction data may include determining a transaction payload. As detailed above, in some embodiments, the transaction payload may include inputs, outputs, operations, and a digital signature. Inputs reference previous transaction outputs, and outputs specify the recipient's address and the amount. In some embodiments, transaction data may also include, e.g., public inputs for the transaction signature 452.

Figure 5:
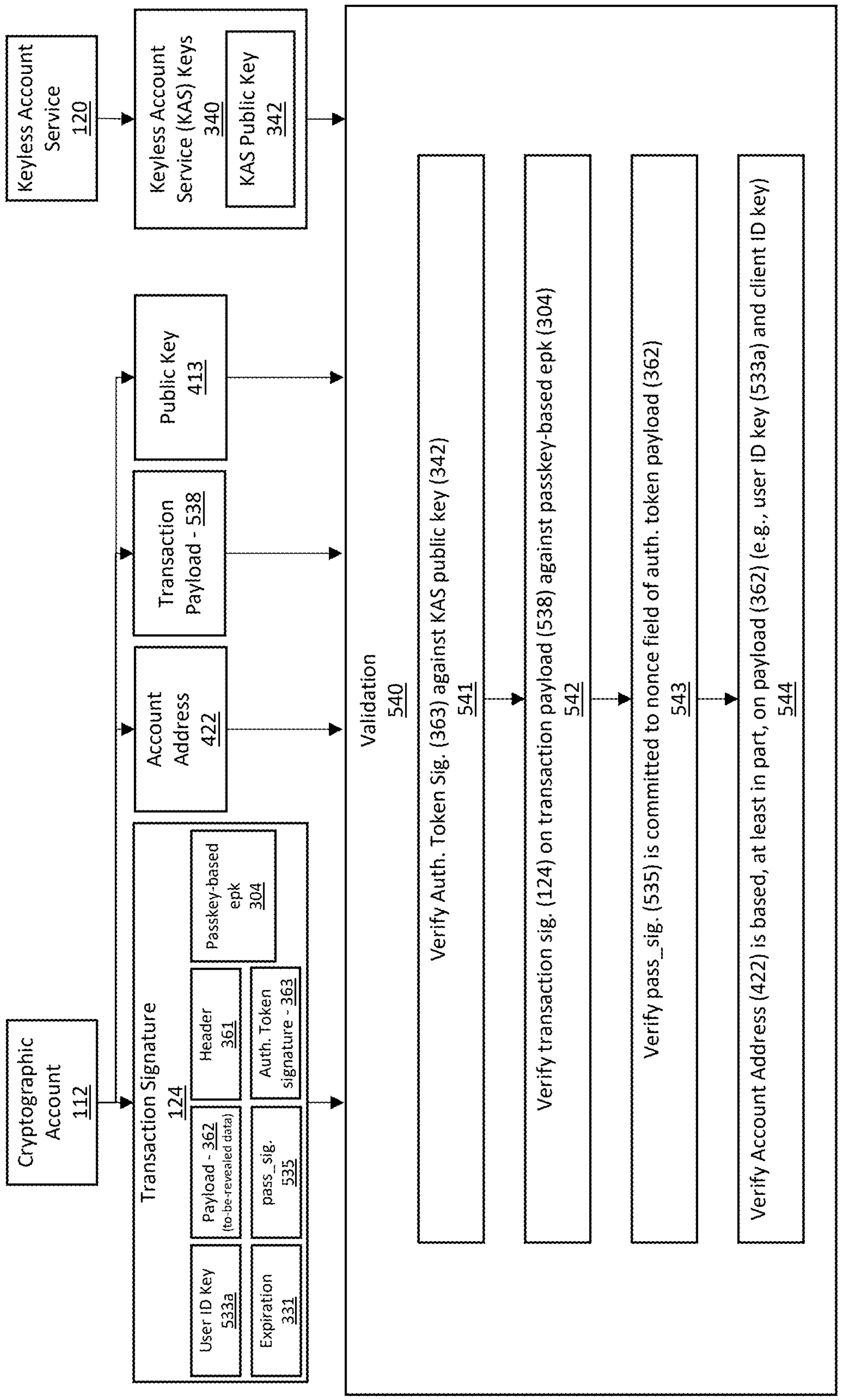
FIG. 5 depicts a validation mechanism for validating a transaction created and signed using the authentication token of the keyless account service in accordance with one or more embodiments of the present disclosure.

In some embodiments, the public inputs may include, e.g., a user ID key, the authentication token payload 362, the authentication token header 361, the public key (e.g., an passwordless secret key-based ephemeral public key as detailed above), a signature under the public key over the transaction data (e.g., an "ephemeral signature"), the authentication token signature 363, the token expiration 331, a pepper, randomness, among other parameters or any combination thereof (see, e.g., FIG. 5 below).

In some embodiments, the public inputs may include, e.g., the authentication token header 361, the public key (e.g., an passwordless secret key-based ephemeral public key as detailed above), a signature under the public key over the transaction data (e.g., an "ephemeral signature"), the passwordless secret credential 125, the token expiration 331, a zero-knowledge proof, among other parameters or any combination thereof (see, e.g., FIG. 6 below). For example, the zero-knowledge proof may be for verification of private information including, e.g., client ID 301, the user ID 302, randomness, the authentication token signature 363, the authentication token payload 362, a pepper, among other sensitive identifying information as described in greater detail below with reference to FIG. 6.

In some embodiments, the signature under the public key over the transaction data (e.g., an "ephemeral signature") may be the transactions signature 452. Thus, the transaction data may be verified based on the transaction signature 452 by fetching the public key 413 from the public inputs of the transaction 451, deriving an address from the fetched public key 413 and verifying the derived address against the published address 422, and verifying the signature under the fetched public key 413 over the transaction 451.

In some embodiments, the transaction with authentication token-based signature 124, including the transaction 451 and the transaction signature 452, may be submitted to the blockchain network 10 for validation 140 and insertion into a block of the ledger 130.

Referring now to FIG. 5, a validation mechanism is depicted for validating a transaction created and signed using the authentication token of the keyless account service in accordance with one or more embodiments of the present disclosure.

In some embodiments, validation 540 may use the transaction signature 124, the address 422 and the KAS public key 342 of the KAS keys 340 form the keyless account service 120. Based on this information, validation 540 may validate the transaction signature 124 and the data thereof. In some embodiments, the transaction data may include the authentication token payload 362 including the passwordless secret credential 125, a user ID key 533*a*, the authentication token header 361, an passwordless secret key-based public key (pass_pk) 536, a pass_sig signature 535, the authentication token expiration 331, the authentication token signature 363, and a transaction payload 538.

In some embodiments, the user ID key 533*a* may include the key of the key-value pair for the user ID claim of the authentication token. The pass_sig 536 may include a pass_sig populating the nonce field of the authentication token 123 and the authentication request 122. Thus, the pass_sig 536 may be used as a limited time or limited use public key for signing the transaction payload 538. As such, the transaction signature 124 may include a signature over the transaction payload 538 under the pass_sig 536. As a result, the pass_sig 536 can be a public key for the transaction signature 124 associated with the authentication token 122 instead of a private key.

In some embodiments, at step 541, validation 540 may validate the authentication token signature 363. To do so, the user ID key 533*a*, the payload 362 (including the passwordless secret credential 125), the authentication token header 361, the expiration 331 and the pass_sig 536, may be signed using the KAS public key 342 to create a derived keyless account service signature ($Sig_{kas}$). The $Sig_{kas}$ may be tested against the authentication token signature 363, and where there is a match, the authentication token signature 363 is verified. Because the authentication token signature 363 is embedded with the authentication token payload 362 and the authentication token header 361, including the claims and/or parameters thereof, and that the $Sig_{kas}$ is produced by signing over the authentication token payload 362 and the authentication token header 361, including the claims and/or parameters thereof, each using the KAS keys 340, the same inputs to the same signing algorithm produce the same signature, thus validating the inputs 564. In so doing, the claims of the authentication token 123 can be authenticated, which, as a result, authenticates passwordless secret credential 125 that is matched to one or more of the claims. Thus, validation 540 can validate the passwordless secret credential 125 in a way that protects confidentiality of the authentication token 123 while selectively revealing certain information associated with the user and/or user's identity. In some embodiments, this step verifies the authentication token signature by requiring that validators agree on the latest authentication tokens (e.g., public keys) of the keyless account service 120, which may publish them, e.g., at a particular URL.

In some embodiments, at step 542, validation 540 may verify the transaction signature 124 on the transaction payload 538 against the pass_sig 536. To do so, the address 422 and the transaction payload 538, may be signed using the pass_sig 536 to create a derived pass_sig signature ($Sig_{pass\_sig}$). The $Sig_{pass\_sig}$ may be tested against the pass_sig signature 535, and where there is a match, the pass_sig signature 535 is verified. Because the pass_sig signature 535 is embedded with the transaction payload 538 and the address 422, and that the $Sig_{pass\_sig}$ is produced by signing over the transaction payload 538 and address 422, each using the pass_sig 536, the same inputs to the same signing algorithm produce the same signature, thus validating the inputs.

In some embodiments, the validation 540 may, at block 543, confirm the pass_sig 536 by checking the pass_sig 536 is committed in the authentication token payload's 362 nonce field, e.g., including asserting authentication token payload ["nonce"] is to be shown as equal to a hash of the passwordless secret key-based ephemeral public key and a pass_sig expiration period (among other parameters such as a pepper, e.g., from the transaction signature where included). Moreover, the validation 540 may confirm that the pass_sig expiration 331 associated with the pass_sig 536 is within a predefined maximum horizon, e.g., by asserting pass_sig expiration period 331 is less than authentication token payload issued—at time plus a maximum expiration horizon, where maximum expiration horizon is an on-chain parameter so if an application mis-sets passwordless secret key-based ephemeral public key expiration period as less than authentication token payload issued—at time, then the passwordless secret key-based ephemeral public key will be expired from the perspective of the blockchain network 10. Additionally, the validation 540 may also or instead check that the pass_sig 536 is not expired based on the pass_sig expiration 331, e.g., including asserting that a current block time is less than the passwordless secret key-based ephemeral public key expiration period.

In some embodiments, at step 544, the validation 540 may verify the account address 422 by verifying that the account address 422 is based, at least in part, on the payload 362, including the user ID key 533*a* and the client ID key, among other data. To do so, in some embodiments, the parameters of the payload 362 may be extracted and the account address may be reconstructed therefrom using the same technique as blocks 410 and 420 detailed above in reference to FIG. 4. By tested whether the reconstructed account address matches to the account address 422, validation 540 can verify that the transaction is attributable to the user's cryptographic account 112 and thus to the user.

In some embodiments, the user ID can be verified according to the user ID key 533*a*. For example, if using email-based IDs, validation 540 may ensure the email has been verified, e.g., if a user ID key 533*a* is to be shown as equal to "email", assert authentication token payload ["email_verified"] is to be shown as equal to "true".

In some embodiments, the validation 540 may also set the user ID value to the value corresponding to the user ID key 533*a*. Thus, the validation may let user ID value (in the payload 362) be set from the user ID key 533*a* in the authentication token payload 362.

In some embodiments, validation 540 may derive the public key of the cryptographic account 112 based on the user ID key 533*a*, the user ID value and the client ID in the authentication token payload 362. The validation 540 may then verify that the derived public key matches the keyless account-based address 422 on-chain by asserting that the keyless account-based address 422 is to be shown as equal to a hash of keyless account service identifier and identity commitment.

In some embodiments, the example of the keyless account service 120 being an OAuth/OpenID authentication mechanism such as an OIDC provider and the authentication token being a JWT, the transaction signature may be over a transaction txn for an address with keyless account-based address auth_key is defined as:

σtxn=(uid_key,jwt,header,pass_sig,σeph,σoidc,exp_date, ρ,r,idc_aud_val)

where:

a. uid_key is the JWT field's name that stores the user's identity, whose value is committed in the address IDC,
b. jwt is the JWT payload,
c. header is the JWT header; indicates the OIDC signature scheme and the JWK's key ID, which may be used to verify the OIDC signature under the correct PK,
d. pass_sig, is a passwordless secret key-based ephemeral public key (pass_sig) generated by the managing application (its associated esk is kept secret on the application managing the cryptographic account 112),
e. σeph is an ephemeral signature over the transaction txn,
f. σoidc is the OIDC signature over the full JWT (e.g., over the header and jwt payload),
g. exp_date is a timestamp past which pass_sig is considered expired and cannot be used to sign TXN,
h. ρ is a high-entropy pass_sig blinder used to create a pass_sig commitment to pass_sig and exp_date that is stored in the jwt["nonce"] field,
i. r is a pepper for the address IDC, In such an example, to verify the σtxn signature, validators may check, at validation 140, that the OIDC provider (1) signed the user identifier and application identifier that are committed in the address IDC (or, the recovery service's ID) and (2) signed the pass_sig which, in turn, signed the transaction, while enforcing some expiration date on the pass_sig.

In this example, validation 540 may include signature verification against the PK (iss_val,addr_idc), which may involve the following:

a. If using email-based IDs, ensure the email has been verified, e.g., if uid_key is to be shown to be equal to "email", assert jwt["email_verified"] is to be shown to be equal to "true",
b. Assert addr_idc is to be shown to be equal to H' (uid_key,uid_val,aud_val;r), using the pepper r from the signature,
c. Verify that the PK matches the keyless account-based address on-chain, including asserting auth_key is to be shown to be equal to H (iss_val,addr_idc),
d. Check the pass_sig is committed in the JWT's nonce field including asserting jwt["nonce"] is to be shown to be equal to H' (pass_sig, exp_date;ρ),
e. Check the pass_sig expiration date is not too far off into the future including asserting exp_date is less than jwt["iat"]+max_exp_horizon, where max_exp_horizon is an on-chain parameter,
f. Check the pass_sig is not expired, including asserting current_block_time( ) is less than exp_date,
g. Verify the ephemeral signature σeph under pass_sig over the transaction txn,
h. Fetch the correct PK of the OIDC provider, denoted by jwk, which is identified via the kid field in the JWT header and
i. Verify the OIDC signature σoidc under jwk over the JWT header and payload jwt. In some embodiments, this step that verifies the OIDC signature includes validators agreeing on the latest JWKs (i.e., public keys) of the OIDC provider, who publishes them at a provider-specific OpenID configuration URL.

In some embodiments, as detailed above, the user may desire or be required to reveal additional information, for example to enable further operations on the blockchain network based on the additional information. Thus, the public information, provided in the transaction data, may include the additional information. Indeed, the to-be-revealed data 305 may be included in an "extra field" associated with providing additional information in the authentication request 122 and the authentication token 123, as well as in the transaction data of the transaction payload 538.

In some embodiments, the extra field may be assigned a certain type of data, such as a user identifier, user contact information, name, location, address, terms of the transaction (e.g., for a contract or agreement), among other data types or any combination thereof. Alternatively, or in additional, the extra field may be assigned no type of data such that the user may populate the extra field with any information.

In some embodiments, in order for the additional information to be verified, the additional information may be included within the authentication token payload. For example, the additional field may be populated with user data that would ordinarily be private or otherwise omitted from the transaction data. But in some scenarios, the user may wish to reveal such information. Thus, the user may include the user data in the extra field of the transaction data as well as a custom check name of the authentication request and/or authentication token. Thus, because the user data is included as a parameter of the authentication token payload, the extra field may be proven via the authentication token signature and the contents of the authentication token payload.

In some embodiments, the extra field may be matched to a standard check name in the authentication token payload (e.g., including those detailed above), or may be in a custom check name field of the authentication token payload. To match the extra field to such check name in the authentication token payload, the extra field may include a key and value, where the key may be set to be the key of the associated check name in the authentication token payload, and the value is set to be the associated additional information. Accordingly, validation 140 may, via the authentication token signature, include verifying that the extra field value is to be shown to be the authentication token payload value associated with the extra field key. For example, in the OAuth/OpenID authentication mechanism, the additional information may be a mailing address, thus the extra field key may be set to be a custom mailing address key with the custom mailing address value such that on validation 140 it is asserted that extra_field_val is to be shown to be jwt [extra_field_key].

Figure 6:
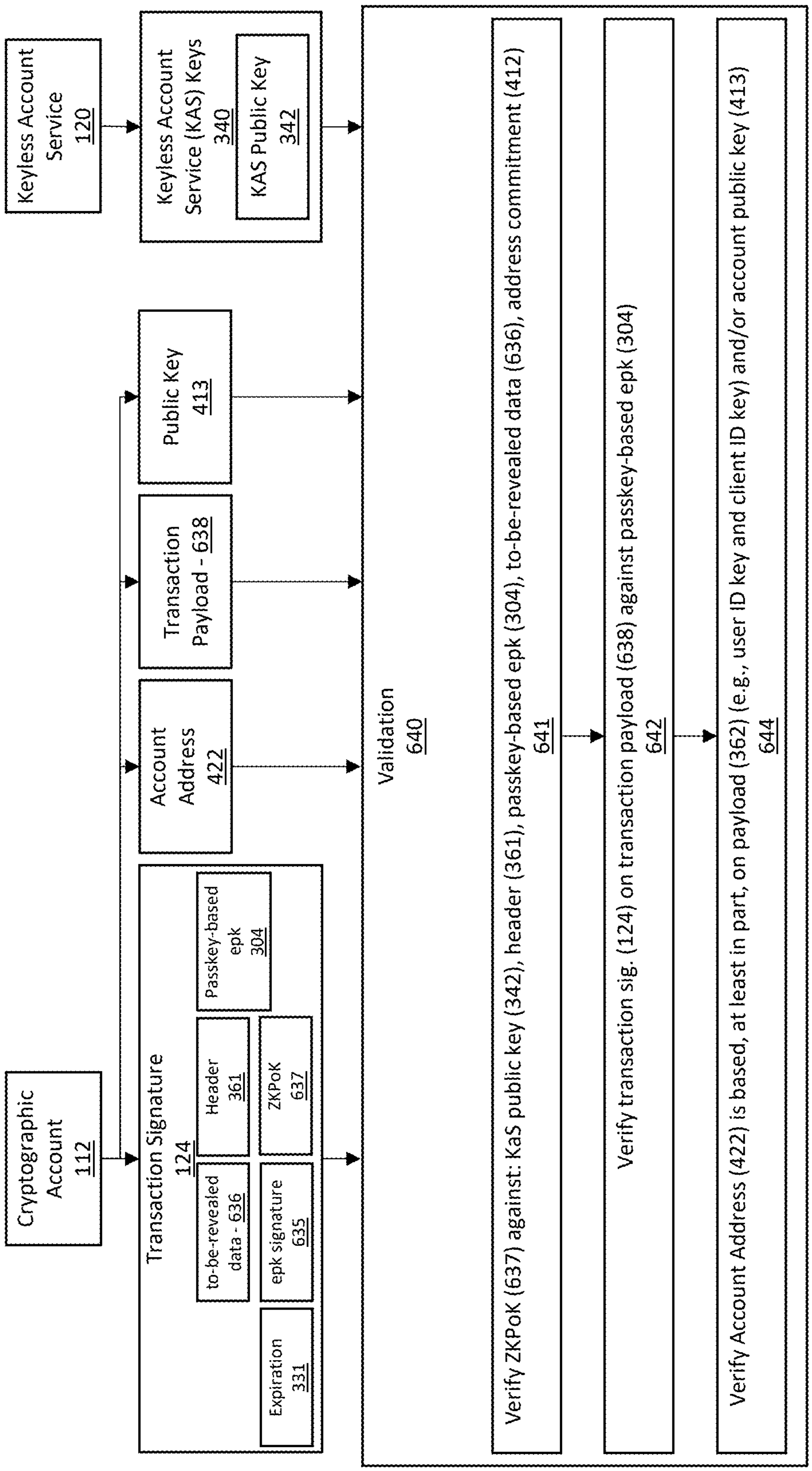
FIG. 6 depicts another validation mechanism for validating a transaction created and signed using the authentication token of the keyless account service in accordance with one or more embodiments of the present disclosure.

Referring now to FIG. 6, another validation mechanism is depicted for validating a transaction created and signed using the authentication token of the keyless account service in accordance with one or more embodiments of the present disclosure.

In some embodiments, the above transactions include the user identifier and authentication token payload, which reveals user information to the blockchain network. Accordingly, to further improve security and confidentiality, the transaction may be based on zero-knowledge signatures. Thus, instead of the user identifier, authentication token payload and authentication token signature, the transaction may include the authentication token header, the passwordless secret key-based ephemeral public key, the passwordless secret key-based ephemeral public key signature, the expiration period, the expiration maximum, and a zero-knowledge proof, where the zero-knowledge proof proves private information including the application identifier, user identifier, authentication token signature, and authentication token payload.

In some embodiments, a zero-knowledge proof (ZKP) includes a cryptographic protocol that enables one party (the prover) to demonstrate to another party (the verifier) that a specific statement is true, without revealing any information beyond the validity of the statement itself. In other words, the prover can convince the verifier that they possess certain knowledge or that a computation was performed correctly, without disclosing the underlying data or the secret itself.

In the context of blockchain and authentication systems, a zero-knowledge proof allows a user to prove, for example, that they have been authenticated by the keyless account service 120 or that they possess a valid credential, without revealing their identity or any sensitive information. The ZKP achieves this by constructing a mathematical relation (often called a zero-knowledge relation) between public inputs (which may include to-be-revealed fields) and secret inputs (such as authentication tokens or private keys). The proof is then verified by checking that the public inputs satisfy the relation, as asserted by the ZKP, without exposing the secret inputs.

A common type of ZKP used in practice is the non-interactive zero-knowledge proof (NIZK), such as a zk-SNARK (Zero-Knowledge Succinct Non-Interactive Argument of Knowledge), which allows the proof to be generated and verified efficiently, often with a single message from the prover to the verifier.

Therefore, in some embodiments, validation 640 may use the transaction signature 124, including the authentication token-based transaction signature, the account address 422, the transaction payload 638, the public key 413 and the KAS public key 342 of the KAS keys 340 from the keyless account service 120. Based on this information, validation 640 may validate the transaction signature 124 and the data thereof with zero-knowledge proving. In some embodiments, the transaction data may include the to-be-revealed data 634, the authentication token header 361, an passwordless secret key-based ephemeral public key (pass_sig) 636, an pass_sig signature 635, the authentication token expiration 331, and a zero-knowledge proof of knowledge (ZKPoK) 637 to validate the transaction signature 124 against the transaction payload 638.

In some embodiments, the pass_sig 636 may include a pass_sig populating the nonce field of the authentication token 123 and the authentication request 122. Thus, the pass_sig 636 may be used as a limited time or limited use public key for signing the transaction. As such, the transaction signature 124 may include an pass_sig signature that is a signature over the transaction payload 638 under the pass_sig 636. As a result, the pass_sig 636 can be a public key for the transaction signature 124 associated with the authentication token 122 instead of a private key.

In some embodiments, at step 641, validation 540 may validate the ZKPoK 637 by deriving a public inputs hash that hashes the derived public inputs of a zero-knowledge algorithm, e.g., utilizing one or more of Succinct Non-Interactive ARguments of Knowledge (SNARK), Scalable Transparent ARgument of Knowledge (STARK), Verifiable Polynomial Delegation (VPD), Succinct Non-interactive ARGuments (SNARG), bulletproofs, among others or any combination thereof. Validating ZKPoK 637 may include deriving the public input by accessing data in the transaction payload 638 and/or deriving items based on the data in the transaction payload 638. In some embodiments, a validator may fetch the pass_sig 636, expiration 331, keyless account service identifier, authentication token header 361, and KAS public key 342 of the keyless account service 120, as well as the address 422 and/or public key 413 associated with the cryptographic account 112.

In some embodiments, the zero-knowledge proof may argue the existence of a secret input that satisfies a keyless zero-knowledge relation. In some embodiments, the secret input, $w_{priv}$, may include, e.g., the client ID value 601*b*, user ID key 633*a* and/or user ID value 633*b*, authentication token signature 363, and authentication token payload 362. Thus, the zero-knowledge proof may prove the relation R according to equation 1 below:

$$R\left(\begin{array}{c} pih; \\ w = [w_{pub} = (epk, addr_{idc}, \mathrm{exp}_{date}, \mathrm{exp}_{maximum}, iss, \mathrm{header}, \mathrm{pk}), \\ w_{priv} = (aud, uid, \sigma_{AT}, \mathrm{payload}_{AT})] \end{array}\right) \quad \text{Eq. 1}$$

where $w_{pub}$ are the public inputs, $w_{priv}$ are the private inputs, epk is the passwordless secret key-based ephemeral public key, $addr_{idc}$ is the identity commitment, $\exp_{date}$ is an expiration period of the pass_sig 636, $\exp_{maximum}$ is the expiration period maximum of the pass_sig 636, iss is the keyless account service identifier, header is the authentication token header 361, pk is the KAS public key 342, aud is the client ID value 601*b* for the application managing the cryptographic account 112, uid is the user ID value 633*b*, OAT is the authentication token signature 363, and payload AT is the authentication token payload 362.

In some embodiments, as detailed above, the user may desire or be required to reveal additional information, for example to enable further operations on the blockchain network based on the additional information. Thus, the public information, provided in the transaction data and derived as public inputs to the zero-knowledge proof, may include the additional information. Indeed, the transaction data may include the to-be-revealed data 634, e.g, in an "extra field" associated with providing additional information.

In some embodiments, the extra field may be assigned a certain type of data, such as a user identifier, user contact information, name, location, address, terms of the transaction (e.g., for a contract or agreement), among other data types or any combination thereof. Alternatively, or in additional, the extra field may be assigned no type of data such that the user may populate the extra field with any information.

In some embodiments, in order for the additional information to be verified, the additional information may be included within the authentication token payload. For example, the additional field may be populated with a user identifier. As detailed above, such information would ordinarily be in the private inputs, but in some scenarios, the user may wish to reveal such information. Thus, the user may include the user identifier in the extra field of the transaction data. Because the user identifier is a parameter of the authentication token payload, the extra field may be proven via the zero-knowledge proof and the contents of the authentication token payload of the secret inputs.

In some embodiments, the extra field may be matched to a standard check name in the authentication token payload (e.g., including those detailed above), or may be in a custom check name field of the authentication token payload. To match the extra field to such check name in the authentication token payload, the extra field may include a key and value, where the key may be set to be the key of the associated check name in the authentication token payload, and the value is set to be the associated additional information. Accordingly, validation 140 may, via the zero-knowledge proof, include verifying that the extra field value is to be shown to be the authentication token payload value associated with the extra field key. For example, in the OAuth/OpenID authentication mechanism, the additional information may be an email address, thus the extra field key may be set to be the uid key with the uid value such that on validation 140 it is asserted that extra_field_val is to be shown to be jwt[extra_field_key].

In some embodiments, at step 642, validation 640 may validate the transaction signature 124 against the pass_pk 636. To do so, the address 422, the transaction payload 638 and the ZKPoK 637, may be signed using the pass_pk 636 to create a derived pass_sig signature ($Sig_{pass\_sig}$). The $Sig_{pass\_sig}$ may be tested against the transaction signature 124, and where there is a match, the transaction signature 124 is verified.

In some embodiments, at step 643, the validation 640 may verify the account address 422 by verifying that the account address 422 is based, at least in part, on the payload 362, including the user ID key and the client ID key, among other data. To do so, in some embodiments, the parameters of the payload 362 may be extracted and the account address may be reconstructed therefrom using the same technique as blocks 410 and 420 detailed above in reference to FIG. 4. By tested whether the reconstructed account address matches to the account address 422, validation 640 can verify that the transaction is attributable to the user's cryptographic account 112 and thus to the user.

In some embodiments, the user ID can be verified according to the user ID key. For example, if using email-based IDs, validation 640 may ensure the email has been verified, e.g., if a user ID key is to be shown as equal to "email", assert authentication token payload ["email_verified"] is to be shown as equal to "true".

In some embodiments, the validation 640 may also set the user ID value to the value corresponding to the user ID key. Thus, the validation may let user ID value (in the payload 362) be set from the user ID key in the authentication token payload 362.

In some embodiments, validation 640 may derive the public key of the cryptographic account 112 based on the user ID key, the user ID value and the client ID in the authentication token payload 362. The validation 640 may then verify that the derived public key matches the keyless account-based address 422 on-chain by asserting that the keyless account-based address 422 is to be shown as equal to a hash of keyless account service identifier and identity commitment.

Figure 7:
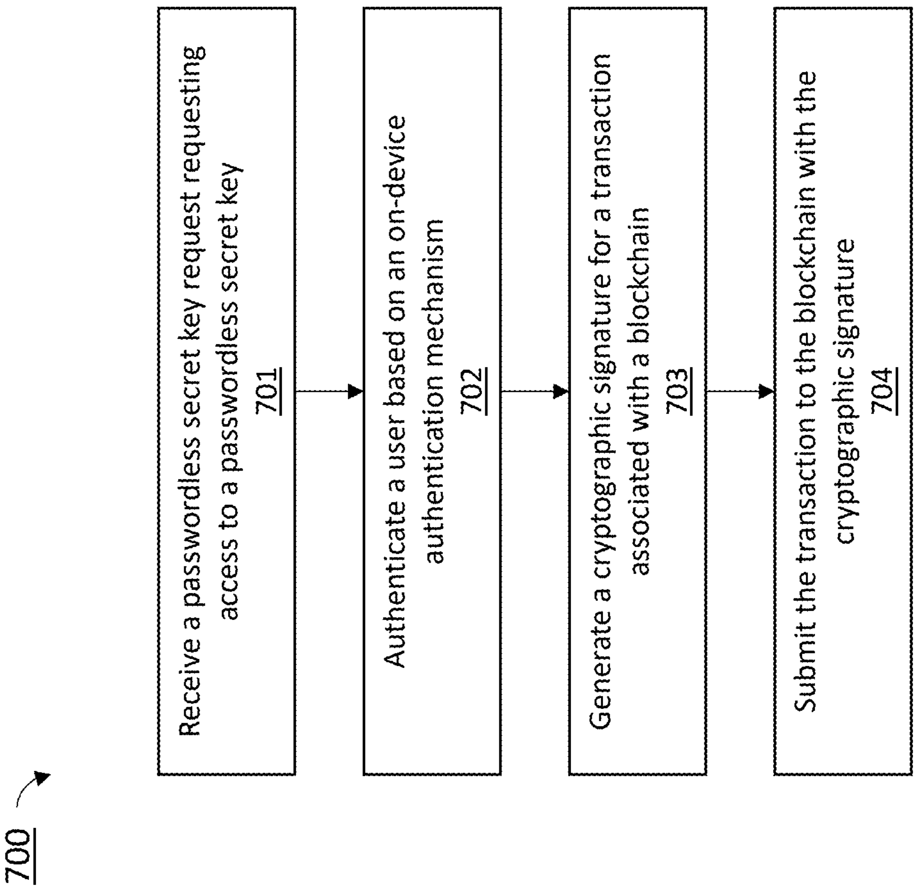
FIG. 7 is a flowchart for an exemplary method of generating a passwordless cryptographic signature for a transaction associated with a blockchain in accordance with one or more embodiments of the present disclosure.

Referring now to FIG. 7, a flowchart 700 is depicted for an exemplary method of generating a cryptographic signature for a transaction associated with a blockchain in accordance with one or more embodiments of the present disclosure.

In step 701, the keyless account service 120 may receive an authentication request. In some embodiments, the authentication request may be requesting access to the secret key. In certain embodiments, the keyless account service 120 may receive the authentication request in response to a user selection on the user device, where the user selection may refer to access to the secret key. In certain embodiments, the secret key may refer to a WebAuthn compliant passkey.

In step 702, the keyless account service 120 may authenticate the user. In some embodiments, the keyless account service 120 may utilize the on-device authentication mechanism to authenticate an identity of the user, where the output of the on-device authentication mechanism may refer to authentication tokens and/or authentication keys. In certain embodiments, the keyless account service 120 may utilize the on-device authentication mechanism to authenticate the user with at least one keyless access service based at least in art one the user logging into the at least one keyless access service using the secret key; receive a keyless access signature based at least in part on the authentication of the user; and generating the cryptographic signature for the transaction based at least in part on the keyless access signature.

In step 703, the keyless account service 120 may generate the cryptographic signature for a transaction associated with a distributed ledger 130. In some embodiments, the keyless account service 120 may generate the cryptographic signature for the transaction based on a cryptographic hash of at least one transaction parameter using the secret key. In certain embodiments, the keyless account service 120 may generate the cryptographic signature for the transaction by decrypting at least one seed phase based on the secret key; deriving at least one private key associated with a blockchain account associated with the user; and applying the cryptographic hash to the transaction parameter based at least in part on a different private key. In certain embodiments, the seed phrase of the secret key may be encrypted using the secret key and the WebAuthn PRF extension. In certain embodiments, the at least one transaction parameter may include a pass_pk, an ephemeral signature associated with the pass_pk, and/or a pepper.

In step 704, the keyless account service 120 may submit the transaction to the distributed ledger 130 with the cryptographic signature. In some embodiments, the keyless account service 120 may submit the transaction to the distributed ledger 130 with the cryptographic signature, where the transaction parameter and a public key are associated with the cryptographic signature. In certain embodiments, the distributed ledger 130 may be configured to validate the transaction based at least in part on the cryptographic signature, the at least one transaction parameter, and the public key.

Figure 8:
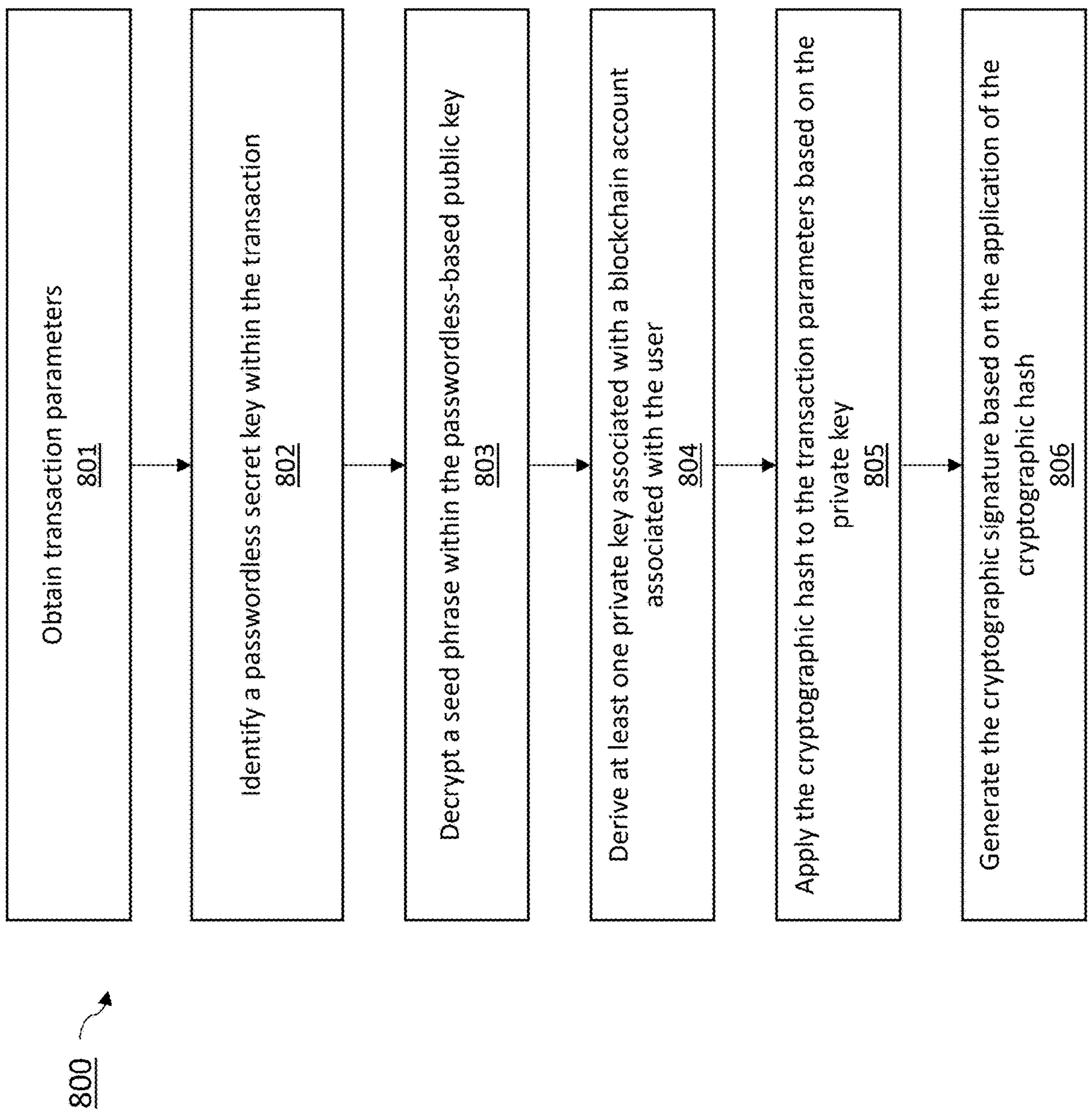
FIG. 8 is flowchart for an exemplary method of deriving a private key for the passwordless cryptographic signature on a blockchain in accordance with one or more embodiments of the present disclosure.

FIG. 8 is flowchart 800 for an exemplary method of deriving a private key to generate the cryptographic signature on a blockchain based on the application of a cryptographic hash in accordance with one or more embodiments of the present disclosure. In some embodiments, at least one processor of a computing device may perform the following steps, where the steps respectively correlate with 801-406 of FIG. 8. In step 801, the keyless account service 120 may receive the transaction. In step 802, the keyless account service 120 may identify a secret key associated with the transaction. In step 803, the keyless account service 120 may decrypt a seed phrase within the secret key. In step 804, the keyless account service 120 may derive at least one private key associated with the blockchain account associated with the user. In step 805, the keyless account service 120 may apply the cryptographic hash to the transaction parameters based on the private key. In some embodiments, the keyless account service 120 may generate the cryptographic signature based on the application of the cryptographic hash.

In some embodiments, the seed phrase of the secret key may be encrypted using the secret key and the WebAuthn PRF extension. In some embodiments, the at least one transaction parameter may include a pass_pk, an ephemeral signature associated with the pass_pk, or a pepper. In some embodiments, the private key may refer to a verified secret key.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24).NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiment of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:

receiving, by at least one processor of a user device associated with a user, a passwordless secret key request requesting access to a passwordless secret key in response to a user selection on the user device to access the secret key;

authenticating, by the at least one processor, the user based at least in part on at least one on-device authentication mechanism;

deriving, by the at least one processor, a passwordless cryptographic signature using the passwordless secret key based at least in part on the user being authenticated by the at least one on-device authentication mechanism;

generating, by the at least one processor, an authentication request to a keyless account service, the authentication request comprising at least one nonce field populated with a passwordless public key associated with the passwordless cryptographic signature;

receiving, by the at least one processor, from the keyless account service in response to the authentication request, a keyless account service signature computed over the passwordless public key and a managing application identifier of a managing application; and submitting, by the at least one processor, a transaction to a blockchain, the transaction comprising:

the passwordless cryptographic signature associated with the passwordless secret key, the keyless account service signature, and at least one transaction parameter;

wherein the blockchain is configured to validate the transaction based at least in part on a verification of the passwordless cryptographic signature using the passwordless public key, and a verification of the keyless account service signature using a public key associated with the keyless account service to verify the authenticity of the passwordless public key.

2. The method of claim 1, wherein the secret key comprises a WebAuthn compliant passkey.

3. The method of claim 1, wherein the on-device authentication mechanism comprises a biometric sensor.

4. The method of claim 1, wherein the on-device authentication mechanism comprises a password/credential manager.

5. The method of claim 1, further comprising:

authenticating, by the at least one processor, the user with at least one keyless access service based at least in part on the user logging into the at least one keyless access service using at least one keyless access service-specific credential;

receiving, by the at least one processor from the at least one keyless access service, a keyless access signature based at least in part on the authentication of the user; and generating, by the at least one processor, upon the authenticating, the cryptographic signature for the transaction based at least in part on the keyless access signature.

6. The method of claim 1, wherein using the secret key for generating the cryptographic signature comprises:

decrypting, by the at least one processor, at least one seed phrase based at least in part on the secret key;

deriving, by the at least one processor, at least one private key associated with a blockchain account associated with the user; and applying, by the at least one processor, at least one cryptographic hash to the at least one transaction parameters based at least in part on the at least one private key.

7. The method of claim 6, wherein the at least one seed phrase is encrypted using the secret key and a WebAuthn PRF extension.

8. The method of claim 1, wherein the at least one transaction parameter comprises at least one of:

the passwordless public key, an ephemeral signature associated with the passwordless public key, a cryptographic pepper, or a combination thereof.

9. The method of claim 1, wherein the at least one nonce field populated with the passwordless public key comprises at least one expiration.

10. The method of claim 1, further comprising:

generating, by the at least one processor, the passwordless signature based at least in part on signing over the transaction parameters and a transaction hash with the passwordless secret key.

11. The method of claim 10, wherein the passwordless secret key request comprises the transaction parameters; and wherein the passwordless cryptographic signature comprises the passwordless signature over the transaction parameters using the passwordless secret key.

12. A system comprising:

at least one processor of a user device associated with a user, the at least one processor being in communication with at least one non-transitory computer readable medium having computer instructions stored thereon, wherein the at least one processor, upon execution of the computer instructions, is configured to perform steps comprising:

receiving a passwordless secret key request requesting access to a passwordless secret key in response to a user selection on the user device to access the secret key;

authenticating the user based at least in part on at least one on-device authentication mechanism;

deriving a passwordless cryptographic signature using the passwordless secret key based at least in part on the user being authenticated by the at least one on-device authentication mechanism;

generating an authentication request to a keyless account service, the authentication request comprising at least one nonce field populated with a passwordless public key associated with the passwordless cryptographic signature;

receiving from the keyless account service in response to the authentication request, a keyless account service signature computed over the passwordless public key and a managing application identifier of a managing application; and submitting a transaction to a blockchain, the transaction comprising:

the passwordless cryptographic signature associated with the passwordless secret key, the keyless account service signature, and at least one transaction parameter;

wherein the blockchain is configured to validate the transaction based at least in part on a verification of the passwordless cryptographic signature using the passwordless public key, and a verification of the keyless account service signature, using a public key associated with the keyless account service to verify the authenticity of the passwordless public key.

13. The system of claim 12, wherein the secret key comprises a WebAuthn compliant passkey.

14. The system of claim 12, wherein the on-device authentication mechanism comprises a biometric sensor.

15. The system of claim 12, wherein the on-device authentication mechanism comprises a password/credential manager.

16. The system of claim 12, wherein the at least one processor, upon execution of the computer instructions, is configured to perform steps further comprising:

authenticating the user with at least one keyless access service based at least in part on the user logging into the at least one keyless access service using at least one keyless access service-specific credential;

receiving, by the at least one processor from the at least one keyless access service, a keyless access signature based at least in part on the authentication of the user; and generating upon the authenticating, the cryptographic signature for the transaction based at least in part on the keyless access signature.

17. The system of claim 16, wherein using the secret key for generating the cryptographic signature comprises:

decrypting at least one seed phrase based at least in part on the secret key;

deriving at least one private key associated with a blockchain account associated with the user; and applying at least one cryptographic hash to the at least one transaction parameters based at least in part on the at least one private key.

18. The system of claim 16, wherein the at least one seed phrase is encrypted using the secret key and a WebAuthn PRF extension.

19. The system of claim 12, wherein the at least one transaction parameter comprises at least one of:

the passwordless public key, an ephemeral signature associated with the passwordless public key, a cryptographic pepper, or a combination thereof.

20. The system of claim 12, wherein the at least one nonce field populated with the passwordless public key comprises at least one expiration.

21. The system of claim 12, wherein the at least one processor, upon execution of the computer instructions, is configured to perform steps further comprising:

generating the passwordless signature based at least in part on signing over the transaction parameters and a transaction hash with the passwordless secret key.

22. The system of claim 21, wherein the passwordless secret key request comprises the transaction parameters; and wherein the passwordless cryptographic signature comprises the passwordless signature over the transaction parameters using the passwordless secret key.

* * * * *